United States Patent [19]
Tanaka et al.

[11] Patent Number: 5,321,832
[45] Date of Patent: Jun. 14, 1994

[54] SYSTEM OF DATABASE COPY OPERATIONS USING A VIRTUAL PAGE CONTROL TABLE TO MAP LOG DATA INTO PHYSICAL STORE ORDER

[75] Inventors: Kazuaki Tanaka, Sagamihara; Kuniaki Yamashita, Naka; Hiromichi Ogata, Fujisawa, all of Japan

[73] Assignee: Hitachi, Ltd., Tokyo, Japan

[21] Appl. No.: 526,838

[22] Filed: May 22, 1990

[30] Foreign Application Priority Data

May 26, 1989 [JP] Japan .................................. 1-131345

[51] Int. Cl.$^5$ ............................................. G06F 13/00
[52] U.S. Cl. ............................ 395/600; 364/DIG. 1; 364/238.6; 364/243.3; 364/245; 364/246; 364/246.3; 364/256.3; 364/256.5; 395/575; 395/400
[58] Field of Search ................ 364/200; 395/375, 700, 395/425, 400, 600, 575, 250

[56] References Cited

U.S. PATENT DOCUMENTS

| | | | |
|---|---|---|---|
| 4,253,145 | 2/1981 | Goldberg | 364/200 |
| 4,376,297 | 3/1983 | Anderson et al. | 364/200 |
| 4,680,703 | 7/1987 | Kriz | 364/200 |
| 4,686,620 | 8/1987 | Ng | 364/200 |
| 4,730,249 | 3/1988 | O'Quinn, II et al. | 395/700 |
| 4,742,447 | 3/1988 | Duvall etr al. | 395/375 |
| 4,835,685 | 5/1989 | Kun | 364/200 |
| 4,853,843 | 8/1989 | Ecklund | 395/600 |
| 4,890,226 | 12/1989 | Itoh | 395/600 |
| 5,008,786 | 4/1991 | Thatte | 395/425 |
| 5,043,871 | 8/1991 | Nishigaki et al. | 395/600 |
| 5,067,105 | 11/1991 | Borkenhagen et al. | 395/400 |
| 5,136,692 | 8/1992 | Barrett et al. | 395/250 |

FOREIGN PATENT DOCUMENTS 57-90770 of 0000 Japan .
1505603 3/1978 United Kingdom ......... G06F 13/00

OTHER PUBLICATIONS

C. J. Date, "An Introduction to Database Systems, vol. II", published by Addison-Wesley Publishing Company, 1983, p. 20.

Primary Examiner—Paul V. Kulik
Assistant Examiner—Wayne Amsbury
Attorney, Agent, or Firm—Fay, Sharpe, Beall, Fagan, Minnich & McKee

[57] ABSTRACT

A method for producing a duplication of a database stored in an external storage by writing over copy data of the database with update log data which was acquired after acquisition of the copy data. This method is implemented in a computer system having a virtual storage operating system. The system includes a virtual storage area which is defined as having virtual pages which have a one-to-one correspondence to blocks in an external copy data storage, where the virtual pages are the database copy data is stored and in an order according to physical addresses of the blocks. Each update log data is acquired in units of the blocks. A control table is provided which includes control values which have a one-to-one correspondence to the virtual pages. A control value from the control table is set when the update log data is set to the virtual pages. Repeated operations are made of reading out the update log data from the external log data storage and checking a corresponding control value to see if the control value is set, and setting the control value if it was not set. The control table is then searched in the order of virtual page arrangement and where the control values are set the update log data is read out and is written over the copy data in the external copy data storage. This writing thereby being done in such order that the actuator has a minimal travel distance to a track position of external storage where the copy data is stored.

32 Claims, 25 Drawing Sheets

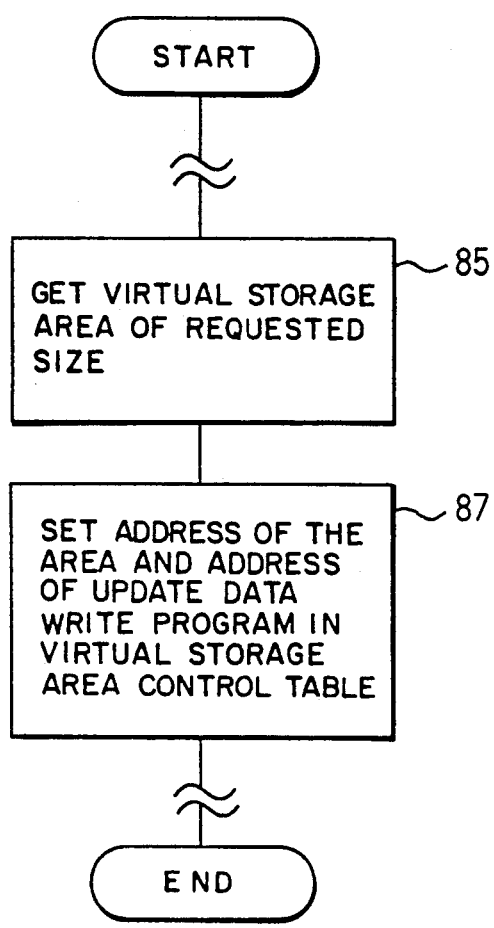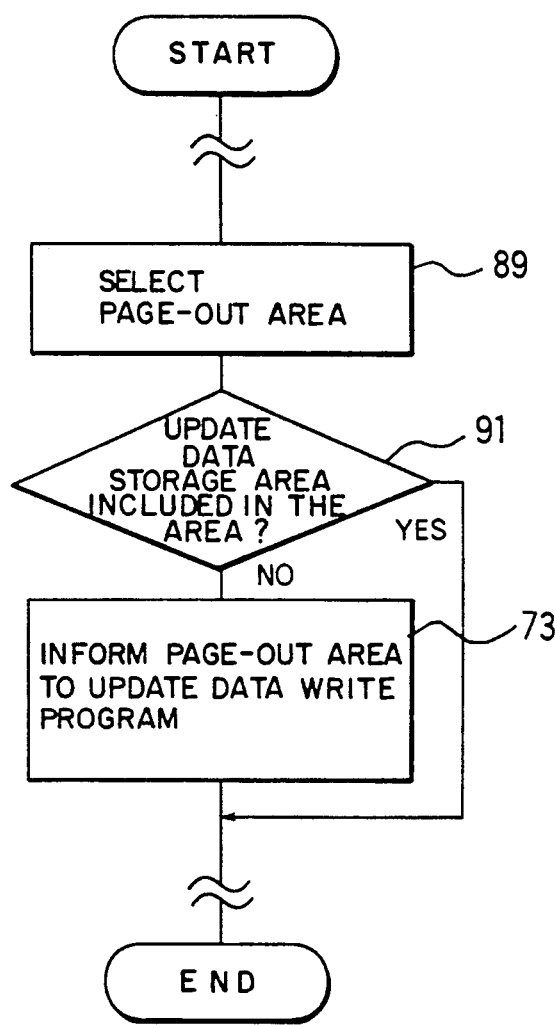

SYSTEM OF DATABASE COPY OPERATIONS USING A VIRTUAL PAGE CONTROL TABLE TO MAP LOG DATA INTO PHYSICAL STORE ORDER

BACKGROUND OF THE INVENTION

This invention relates to a method of producing a duplication of a database capable of accomplishing a high-performance processing for writing differential data and historical update log data over copy data of the database.

A conventionally known method of database fault recovery is designed to write, over copy data, the database updating log data since the acquisition of the copy data, as described in a publication entitled "An Introduction to Database Systems, Vol. II" by C. J. Date published by ADDISON-WESLEY PUBLISHING COMPANY in 1983, page 20.

Copying all data stored on a magnetic disk or the like takes too long a time to copy. Therefore, according to the conventional technique, in order to confine the object of copying to portions which have been altered by job executions since the previous backup operation, a magnetic disk unit or the like is provided with a control memory for recording the updated portions and a means of transferring the contents of the control memory to the host system for the backup operation. The host system issues a command for reading only updated portions to the magnetic disk unit in accordance with the contents of the control memory.

A conventionally known system of this kind is disclosed in Japanese Patent Unexamined Publication No. 57-90770, for example. This system has its magnetic disk unit or the like provided with a control memory for recording the location of data which have been altered by job executions, and at a backup operation, the host system reads the contents of the control memory and issues ad command only for the updated portions in order to request the controller of the magnetic disk unit or the like to read the updated data.

The system is thus capable of backing up only data portions in the database which have been revised during a particular period (these backup portions will be termed "differential copy"). In order to restore the contents of the database at the occurrence of a fault, it is necessary to write the differential copy data over the backed up data, which is the entirety of the database irrespective of the update history (this backed-up data will be termed "whole copy"), and overwrite the update log data of the database since the acquisition of the differential copy.

However, the system does not deal with the matter that a growing volume of differential copy data and update log data will result in a prolonged overwrite processing time prolonged copy duplication producing time, and eventually in the retardation of database recovery from a fault.

Database multiplexing is known as a method of enhancing the reliability of a database. The multiplexing method, which suffers a significant overhead of accessing multiplexed portions at each database updating, is replaced with another known multiplexing method which writes, over the copy data of a database at a point in time, the update log data since that time in order to alleviate the overhead of database updating, although it involves the retardation. However, this method does not consider the fact that a growing volume of update log data and differential copy data will exacerbate the retardation, as in the case of the fault recovery.

Moreover, the above-mentioned prior art necessitates writing the differential copy data and database update log data over the copy data sequentially in the order of the time of database update events, and therefore these data are stored in random locations in the external storage without the consideration of its physical location.

SUMMARY OF THE INVENTION

Attention is paid to the fact that the track-wise or cylinder-wise data writing to an external storage, i.e., in consideration of its mechanical characteristics, is faster by several fold than writing data regardless of the track or cylinder position, and it is an object of this invention to reduce the time for writing the differential copy data and update log data over the copy data to a fraction of the time expended conventionally, by utilization of the mechanical characteristics of the external storage while retaining the sequential relation with updating events.

The present invention is based on the following premises: (1) database and its copy data consist of pieces of data each having a fixed-length unit area called a "block"; (2) update log data is acquired for each block; (3) the operating system can set up a virtual storage address space for placing the whole database or virtual pages in virtual storage corresponding to blocks of external storage for which duplication production is intended.

The above objective is achieved by the method of producing a duplication of a database, recovering the database from a fault and multiplexing, with retardation, the database by writing, over the database copy data stored in an external storage, the update log data since the acquisition of the copy data. This is accomplished in a computer system having a virtual storage operating system, a virtual storage area formed in virtual pages arranged in one-to-one correspondence to the blocks in the external storage where the copy data of database is stored and in the order of physical address of the blocks is defined, update log data acquired for each block is set by assigning real storage sequentially to the virtual page corresponding to the block, in which copy data to be replaced by the log data exists. The update log data in the real storage is written over the copy data in the external storage in the order of arrangement of the virtual pages.

More preferably, the update log data is read out of the external storage, where the data has been stored in advance, in the order of its acquisition.

More preferably, for each external storage where copy data is stored, the update log data which is set in real storage of virtual pages is written over the copy data in the external storage.

More preferably, the update log data set in real storage of virtual pages, which is to be overwritten on the same track of the external storage where the copy data is stored, is written in the form of an integrated unit over the copy data in the external storage.

More preferably, the update log data set in real storage of virtual pages, which is to be overwritten on each track of the same cylinder of the external storage where copy data is stored, is written in the form of an integrated unit over the copy data in the external storage.

More preferably, the update log data is written over the copy data so that the moving distance of the actuator to the track position in the external storage, where the copy data is stored, is minimal.

More preferably, the update log data in units of track is written sequentially on tracks of the adjacent cylinder.

More preferably, the update log data in units of track is written sequentially on tracks of the same cylinder and, next, on tracks of the adjacent cylinder.

More preferably, a field of control value is provided for each virtual page, and when the update log data is set in real storage of the virtual page, its value is set in the control value field, and the update log data in the real storage of virtual page, with the value being set in the control field, is written to the external storage where the copy data is stored.

More preferably, the control value is set to represent whether the update log data is present or absent.

More preferably, the control value is set to indicate the time sequential relation on the acquisition of the update log data.

More preferably, the entry of the update log data from external storages and the setting of it to virtual pages are carried out for each external storage where the update log data is stored.

More preferably, the update log data is fetched, and a value indicative of the time sequential relation on the acquisition of the update log data is compared with the control value in the control table for each virtual page where the update log data is set, so that real storage of the virtual page contains the latest update log data.

More preferably, a control flag for the exclusive use of the control table is provided, and the update log data is fetched individually for each of external storages where update log data is stored, and the comparison of the time sequential relation on the acquisition of update log data is carried out exclusively based on the control flag.

More preferably, in place of the page-out process for a virtual page which has the assignment of real storage and setting of update log data, the update log data is written over the copy data, and the real storage is freed from the virtual page.

More preferably, in place of the page-out process for a virtual page which has the assignment of real storage and setting of update log data, the update log data is written over the copy data, and the real storage is freed from the virtual page, and the value of the control field of the virtual page is initialized.

More preferably, in place of the page-out process for a virtual page which has the assignment of real storage and setting of update log data, the update log data set in real storage of virtual pages, with corresponding blocks being located on the same track as of the virtual pages, is written at once over the copy data.

More preferably, real storage of virtual pages, in which the update log data and control value are set, is placed in a nonvolatile storage.

More preferably, in a database control system which outputs the update log data upon settlement of database updating, the update log data is used in an intact manner.

More preferably, among a group of update log data, only update log data for each block of the external storage to be recovered is selected and set in real storage of the corresponding virtual page.

More preferably, among a group of update log data, only update log data corresponding to each block of the external storage to be recovered is selected and set in real storage of the corresponding virtual page.

More preferably, the objective is achieved by the method of producing a duplication of a database, over the whole copy data of a database stored in an external storage. This is a copy of only updated portions of the database since the acquisition of the copy data, and the update log data, wherein a virtual storage area formed in virtual pages arranged in one-to-one correspondence to blocks in the external storage, in which the copied data of database is stored, and in the order of physical address of the blocks is defined, and, for the differential copy data. Real storage is assigned sequentially to virtual pages corresponding to the blocks where copy data to be replaced by the differential copy data exists, and each differential copy data is stored in the real storage assigned to it, and, for the update log data, real storage is assigned sequentially to virtual pages corresponding to the blocks where copy data to be replaced by the update log data exists. Update log data is stored in the real storage assigned to it, and the differential copy data and update log data in the real storage are read out in the order of arrangement of virtual pages and written over the copy data in the external storage.

More preferably, the differential copy data is set in real storage of a virtual page, and next the update log data since the acquisition of the differential copy data is set in the real storage of the virtual page.

More preferably, when differential copy data exist over a plurality of generations, the data are fetched in the time sequential order of their acquisition.

More preferably, the differential copy data is stored, with a value indicative of the time sequential relation appended to the first update log data since the acquisition of the differential copy data being appended thereto. In a case where another different differential copy data exists for the same virtual page, the one indicated latest in the time sequential relation appended to the differential copy data is selected as the contents of real storage, or in case different update log data exist for the same virtual page, the one indicated latest in the time sequential relation appended in the update log data is selected as the contents of real storage. In a case where log data and differential copy data exist for the same virtual page, the update log data is selected as the contents of real storage if the time sequential relation appended to the update log data is equal to or newer than that appended to the differential copy data, or the differential copy data is selected as the contents of real storage if the time sequential relation appended to the differential copy data is newer than that appended to the update log data.

More preferably, in correspondence to virtual pages, control value fields for setting the time sequential relation of data set in the virtual page real storage and a value indicative of the type of data are provided, and a value indicative of the time sequential relation and a value indicatives of differential data are set in the control field of virtual page where the differential copy data is set, and a value indicative of the time sequential relation appended to each update log data and a value indicate of update log data are set in the control field virtual page where the update log data is set.

More preferably, the objective is achieved by the provision, in correspondence to each virtual page, of a control field for setting the time sequential relation of differential copy data set in the virtual page real storage and a control field for setting the time sequential relation of update log data.

More preferably, the objective is achieved by the provision of a control flag for the exclusive use of the control field, so that the setting process of the differential copy data and update log data to the virtual page real storage is carried out irrespective of the time sequential order of their acquisition.

More preferably, only differential copy data for each block of the external storage, for which fault recovery is intended, is selected from among a group of differential copy data, and it is set to real storage of the corresponding virtual page.

Next, the action and effectiveness of this invention will be described.

1. The fundamental acts of this invention are as described in the following items (1) through (4), and accordingly in writing, over copy data of a database, the update log data since the acquisition of the copy data, it can be confined to only the latest one among items of updating in the same block, and unnecessary overwrite processes can be eliminated.

In the conventional method, update log data are written over the copy data in the time sequential order of its acquisition, and therefore the writing position (e.g., the cylinder position and track position in the case of a magnetic disk) is virtually a random procedure. On this account, it takes a considerable positioning time for moving the actuator to the intended position and disk rotation wait time for each update log data. According to the present invention; the update log data is arranged in units corresponding to a cylinder and/or track so that the data is written at once in units of track, a whereby the disk rotation wait time for each update log data can be minimized. In addition, since the data is written sequentially in contiguous track positions, the actuator has a minimal travel distance and the positioning time can be reduced significantly.

Consequently, it is possible to drastically reduce the time for writing the update log data over the copy data, which takes the most time of the database fault recovery time.

(1) A virtual storage area is provided consisting of virtual pages which are in one-to-one correspondence to blocks in an external storage where database copy data for which duplication production is intended is stored, and arranged in the order of physical addresses of the blocks, and a control flag indicative of whether or not the update log data is set in the real storage corresponding to each virtual page.

(2) Each update log data, which is stored in advance in the external storage, is fetched in the order of acquisition, and real storage is assigned to sequentially correspond to the virtual page of (1) corresponding to the copy data block were the acquired update log data is to be written, and the control flag is set to the state indicating that updating has been made.

(3) All update log data, which is set in real storage of virtual pages in correspondence to the same cylinder (only in the case of an external storage having the concept of cylinder, e.g., magnetic disk) and the same track of the external storage where the copy data is stored, are arranged based on the control flag on completion of (2).

(4) The update log data, which has been arranged in units of cylinder and track in (3) is written over the copy data on tracks of the same cylinder and next on the adjacent tracks.

2. As will be described in the following items (1) through (4), as a control value indicating that update log data is set in real storage of a corresponding virtual page, a value indicative of the time sequential relation of database updating (the time of acquisition of the update log data, as an example for the following explanation) is used. An exclusive control flag for the exclusive use of the control value is provided, so that, in case update log data is stored distributively in a plurality of external storage units, the entry of the data and the setting process of the virtual page real storage are carried out concurrently for individual external storage units thereby to further reduce the processing time.

In case the copy data is stored distributively in a plurality of external storage units, the write process of the update log data, which is set in the virtual page real storage, over the copy flag is carried out concurrently for individual external storage units where the copy data is stored thereby to further reduce the processing time.

Consequently, the time for fetching the update data and the time for writing it over the copy data can further be reduced as compared with the case of item 1.

(1) In case a virtual storage area consisting of virtual pages which are in one-to-one correspondence to blocks in an external storage, where database copy data for which duplication production is intended is stored, and arranged in the order of physical address of the blocks is set, and the update log data is set in the virtual page real storage corresponding 10 to each virtual page, there are provided an update area control table for setting the time of acquisition of the update log data and an exclusive control table for the exclusive use of the above table. The exclusive control table may be provided to include one flag as the whole, or one flag for each virtual page, cylinder, track or block of the external storage where the copy data is stored, in compliance with the unit of exclusiveness of the update area control table. The following explanation is based on a single flag as the whole. In order to use the update area control table exclusively, it is confirmed that the flag is not ON, i.e., no other person is using it, and after turning on the flag the update area control table is made reference and revised. The user turns off the flag to terminate the exclusive use.

(2) For each external storage unit where update log data is stored, the following process of item (3) is carried out concurrently. (3) for each update log data read out of the external storage unit, the following items are implemented.

① In order to lock the update area control table, the flag of the exclusive control table is turned on.

② It is judged whether, in the virtual page of (1) where the update log is to be written from the update are control table, another update log data which has been acquired at a time later than the update log data is already set, and, if it is present, the update log data is ignored, or, if it is absent, the update log data is set in the virtual page real storage.

③ The time of acquisition of the update log data is set in the update area control table.

④ On completion of item (2) for all update log data, the processes of items 1.(3) and 1.(4) are carried out concurrently for each external storage unit where copy data is stored.

3. Next, in item 2.(2), it is possible to avoid paging against the update log data in the real storage which is assigned to a virtual page, by making the foregoing step to further act as follows. Namely, when the update log data is paged out, it necessitates three I/O processes of page-out, page-in and writing the data over the copy data, whereas according to this invention it merely needs a single process of writing the data over the copy data. In case page-out is needed for the update log data will has been set earlier among a plurality of update log data existing for the same block, it necessitates three I/O processes of page-out and page-in for the first-set update log data and, after replacing the first-set update log data with the successive update log data, writing of the data over the copy data.

According to the present invention, it needs only two I/O processes for writing the first-set update log data and later-set update log data over the copy data.

(1) In place of the page-out process for a virtual page which has the assignment of real storage and setting of update log data, update log data in the virtual page real storage and on the same track in the external storage corresponding to the virtual page are written at one over the copy data.

(2) The real storage for the objective area of (1) is freed, and the control flag is altered to the state indicating that update log data is absent.

4. By setting, in a nonvolatile storage, the control flag in the virtual storage and the real storage to be assigned to the update data storage area, the event of recursive writing process for the update log data over the copy data due to power outage or the like does not occur, and a highly reliable database duplication production process can be accomplished.

5. By using, as update log data, the update log data produced at updating of the database, the need of fetching the database update log data from the external storage is eliminated.

6. In order to be responsive to the database recovery method in which copy data only for updated portions of the database during a period, called differential copy, is written over the whole copy and thereafter the update log data of the database is overwritten thereby to restore the contents of the database before the occurrence of the fault, differential copies existing on a plurality of planes are set in an updated data storage area which is defined in virtual storage. Next the update log data of the database is set, in place of the above item 1.(2). Subsequently, a process of overwriting the file, where the whole copy is stored, in units of track and cylinder is arranged.

Consequently, the occurrence of duplicate I/O processes for the same cylinder and track, which is caused by the process of writing the differential copy over the whole copy and the process of further overwriting the database update log data, can be prevented, whereby the recovery time can further be reduced. Conventionally, because of separate writing of the differential copy data and update log data, the actuator scans the storage, whereas the method based on this invention implements both processes in a single scan and the writing time can be reduced.

By application of the above item 2, not only to the entry of update log data, but also to the entry of differential copy data, when differential copy data exists on a plurality of planes, in which case conventionally the data is read out of the differential copy data storage files sequentially in compliance with the time sequential order of its acquisition and then written to the whole copy data, whereas according to this invention the entry of differential copy data from the external storage to the main storage or extended storage can take place concurrently and the entry time can be reduced accordingly.

Instead of dealing with the update log data of the database, but by setting only a plurality of differential copy data as update data in the update data storage area defined in the virtual storage area and writing the data over the whole copy at one, it is also possible, for the retrieval of the contents of database at one time point or for the prior merging of the differential copy data with the whole copy, to carry out the write process for the differential copy data up to that time point over the whole copy at a high speed.

7. In order to responsive to the case where the time sequential relation among the differential copy data and update log data cannot be determined by merely comparing the value indicative of the relation appended to these data, a control field is provided in correspondence to virtual pages for setting the type of updating data including the differential copy data and update log data set in real storage, and a process is arranged for determining the time sequential relation among the differential copy data and update log data based on the value indicative of the time sequential relation and the type of updating data, thereby implementing the concurrent entry process for the differential copy data and update log data from the external storage to the main storage or extended storage.

Consequently, an prolonged execution time due to the wait for the entry can be reduced as compared with the case of the serial entry process for the differential copy data and update log data. Particularly, if parallel input based on the multi-processor configuration is possible, the total entry time can be reduced from the sum of the differential copy data entry time and database update log data entry time to the longest of entry times from external storage units where the differential copy data and database update log data are stored.

BRIEF DESCRIPTION OF THE DRAWINGS

FIG. 7 is a flowchart showing the process of the virtual storage control module based on the embodiment 2;

FIG. 8 is a flowchart showing the process of the paging control module based on the embodiment 2;

DESCRIPTION OF THE PREFERRED EMBODIMENTS

The following describes embodiment 1 of this invention.

An essential feature of this invention is to rearrange the update log data in compliance with the physical arrangement order of the external storage where copy data is stored and where the update log data is written over the copy data. On this account, a logical virtual memory is defined in the address space of virtual storage which is incomparably greater in capacity than a real storage, such as the main storage, or an external storage in correspondence to blocks of the external storage which is incomparably greater in capacity than the real storage. The update log data is stored through the assignment of real storage only to virtual memories corresponding to blocks where update log data resides, and thereafter the update log data is written over the copy data at once in units of cylinder and track in compliance with the order of cylinders and tracks of the external storage.

This invention enhances the performance of the update log data overwrite process.

Figure 1:
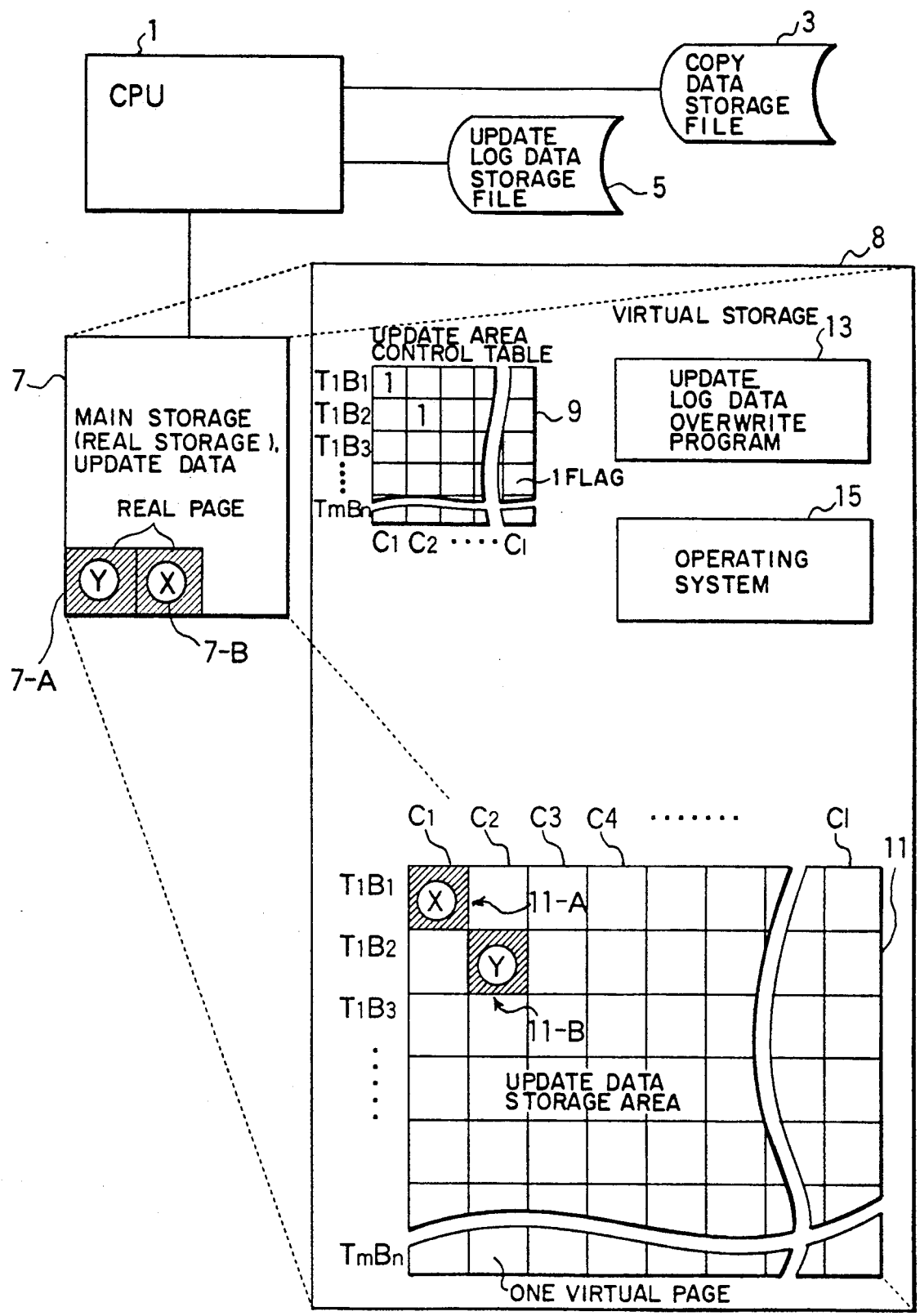
FIG. 1 is a block diagram showing the overall arrangement of embodiment 1 of this invention.

FIG. 1 is a block diagram of the overall arrangement of embodiment 1. Indicated by 1 is a CPU (Central Processing Unit), 3 is a copy data storage file in an external storage where copy data of a database is stored, 5 is an update log data storage file in the external storage where update log data is stored, 7 is a real storage such as a main storage or extended storage. A virtual storage 8 has its virtual address mirroring the real address of the real storage, 9 is an update area control table containing flags assigned to virtual pages for indicating whether or not the update log data is set in the real storage of virtual pages in an update data storage area 11, which comprises virtual pages arranged in one-to-one correspondence to blocks in the external storage, where copy data is stored, and in the order of physical address, 13 is an update log data overwrite program, and 15 is an operating system.

The number of virtual pages which form the update data storage area 11 is equal to the number of all blocks in the external storage. Accordingly, the size of the update data storage area 11 is equal to the block size multiplied by the number of blocks. The virtual page address for setting a value to one virtual page can be obtained by adding, to the starting address of the update data storage area, the relative block number in the external storage or the product of the cylinder number, track number on the cylinder, block number on the track and block size. As a method of defining the area for the external storage having (cylinders, m tracks in each cylinder and n blocks on each track, it may be defined in the form of an array table (one element corresponds to one block) which contains cylinder numbers $C_1, C_2, \ldots, C_l$, track numbers $T_1, T_2, \ldots, T_m$, and block numbers $B_1, B_2, \ldots, B_n$.

Update data storage areas for a plurality of external storages may be defined. In this case, such a processing as memorizing the starting addresses of individual external storages is required.

An update data storage area may be established for part of an external storage, instead of the whole external storage. In this case, the address calculation involves the adjustment by subtracting a constant from a relative block number or the product of a cylinder number, track number and block number.

Setting a value to the update storage area 11 is an expression in a logical sense or imaginary sense in the field of the well-known virtual storage method, and actually a value is set to a real storage which is assigned by the operating system. For example, setting values X and Y logically to virtual pages 11-A and 11-B in the update data storage area 11 in the virtual storage 8 in FIG. 1 signifies storing of the values X and Y in the real pages 7-B and 7-A in the real storage 7, actually. In this invention, no real storage is assigned to a location where no logical value is set. Accordingly, even though the update data storage area 11 in the virtual storage 8 is defined to be incomparably larger than the capacity of the real storage 7 so as to meet the capacity of the corresponding external storage, the real storage capacity which is actually needed is equivalently the total size of the updated blocks excluding duplicate blocks.

The fact that a control table which presents the correspondence between virtual pages in the virtual storage and real pages in the real storage is provided in the real storage, and that the update area control table 9, update log data overwrite program 13 and operating system 15 are actually resident in the real storage are all self-evident in the well-known virtual storage system, and their depiction and explanation will be omitted.

Figure 2:
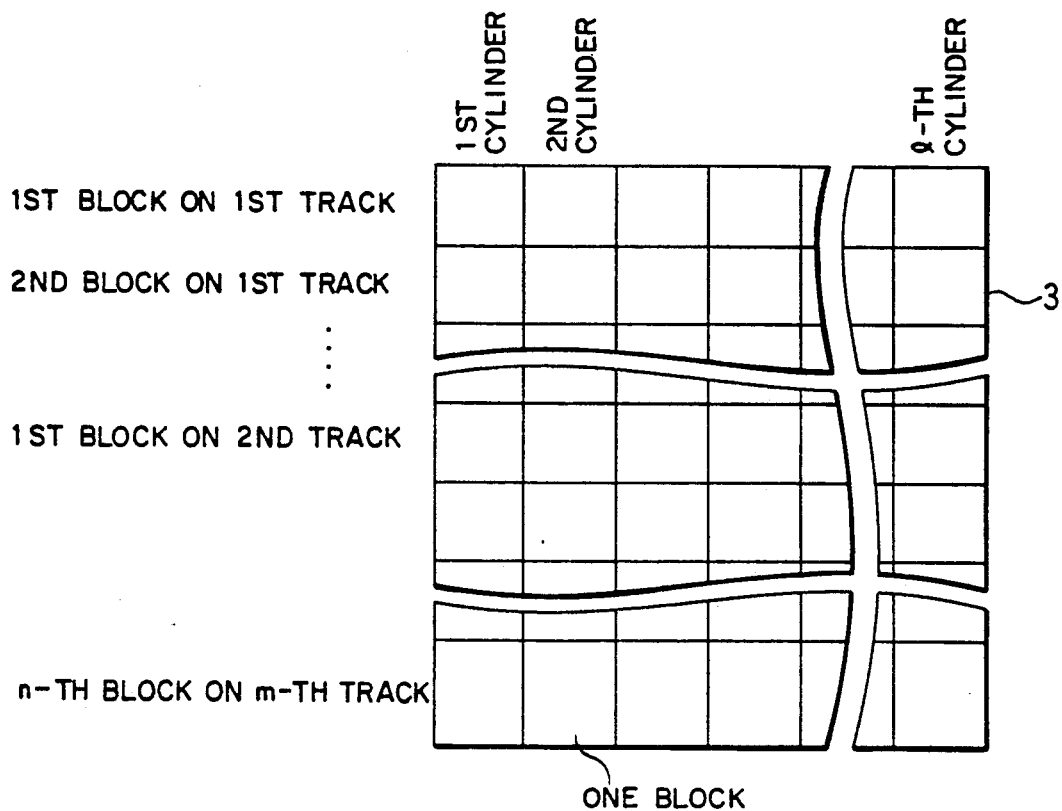
FIG. 2 is a diagram showing the logical arrangement of copy data based on the embodiment 1.

Copy data has its logical arrangement dependent on the physical structure of the external storage. The logical structure of copy data of the case where the external storage is a magnetic disk will be explained in connection with FIG. 2. Copy data 3 has a minimum unit of a block, and is arranged on tracks and cylinders. The number of blocks n on a track, the number of tracks m in a cylinder, and the number of cylinders l are determined from the block length and the numbers of tracks and cylinders in a physical sense that are all predetermined by the definition of the physical structure of the database.

Figure 3:
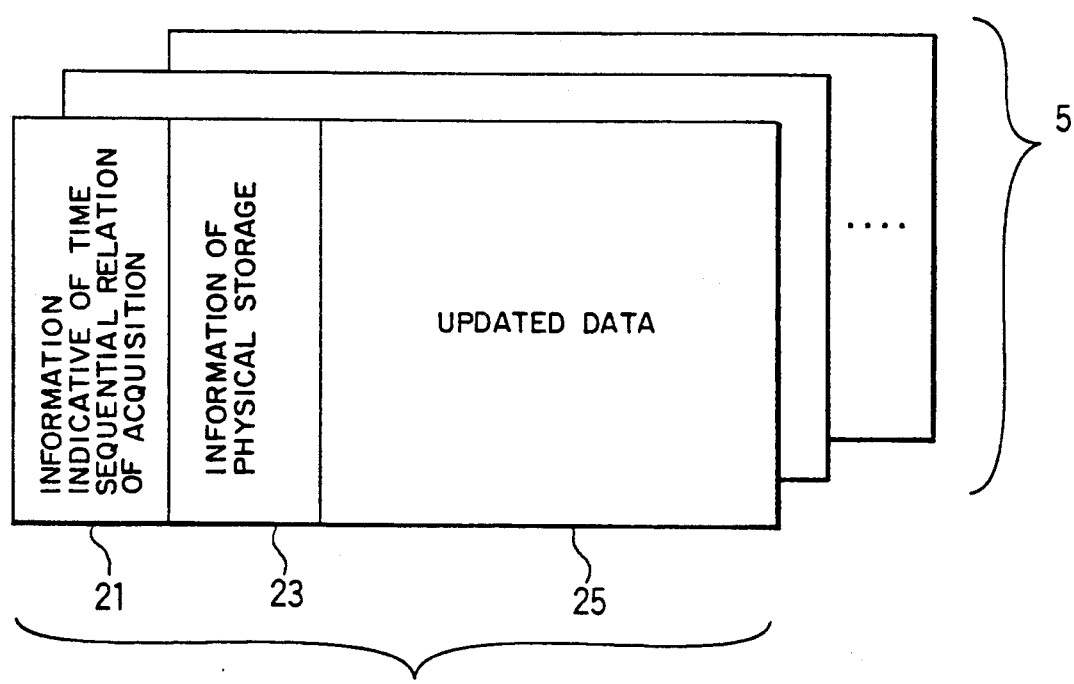
FIG. 3 is a diagram showing the logical arrangement update data based on the embodiment 1.

The logical structure of update log data will be explained in connection with FIG. 3. Update log data is registered in the update log data storage file, in which each block of data forms a record 19. Each record consists of information 21 indicative of the time sequential relation of the acquisition of the update log data, e.g., the time when the database has been updated, an update log serial number which is given uniquely to match the order of database updating, or the number which is the combination of the update log serial number for the self computer and update log serial numbers for other computers with the intention of determining specifically the update order of the database which is shared by a plurality of computers. The record further includes information 23 of physical storage location, e.g., a serial number or name given uniquely to the external storage, cylinder number, track number and block number, and updated data 25.

Next, the processing of individual programs will be explained. Processes of an operating system, such as for the assignment of real pages in the real storage for virtual pages in the virtual storage, etc. are identical to those of the well-known virtual storage operating system. The present invention does not confine the method of these processes, and explanation thereof will be omitted.

Figure 4:
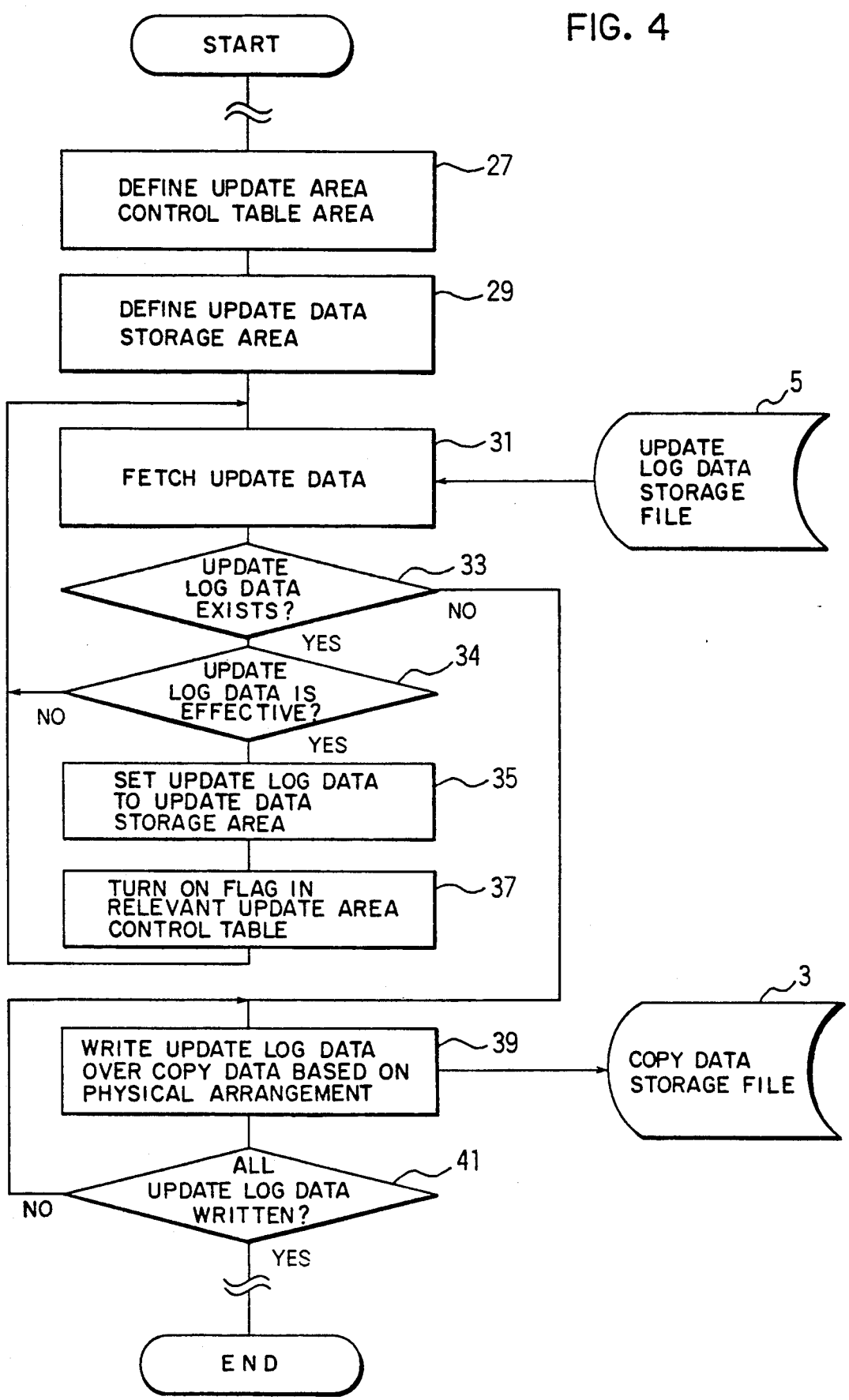
FIG. 4 is a flowchart showing the process of the update data overwrite program based on the embodiment 1.

The process of the update log data overwrite program 13 will be explained with reference to the flowchart of FIG. 4.

When this program is started, an update area control table 9 which contains flags equal, in number to blocks of the database, i.e., copy data, is put into the virtual storage (27). For example, each flag may be defined as an element of character "1" or "0" in a three-dimensional array for the cylinder number, track number and block number, or it may be defined in a two-dimensional array of a cylinder number and a combined number indicative of a block number on its high-order P digits and a block number on its low-order Q digits.

Similarly, an update data storage area 11 including virtual pages equal in number to blocks of copy data is defined in the virtual storage (29). It is defined as an array having its elements formed of a block. Real storage is not assigned to virtual pages of the update area control table 9 and update data storage area 11 defined in the virtual storage 8 at the time of definition. The operating system assigns real storage unit 7 at the point in time of execution of the command which sets a value of a flag in the update area control table or the command which sets update log data to a virtual page. The method of real storage assignment, the unit of assignment, the method of relational management for the virtual storage, etc. are out of concern to the present invention, and they are identical to the processing method of the well-known virtual storage system.

In the following explanation, for the sake of clarification of description, it will be expressed that values are set directly to flags in the update area control table in the virtual storage or to virtual pages of the update data storage area, although they are actually set to the real storage corresponding to the virtual storage.

An update log data record 19 in need of writing over the copy data 3 is read out of the update log data storage file 5 in the external storage in the order of acquisition, i.e., on a first-acquired-first-fetched basis, with reference to the information 21 indicative of the time sequential order of acquisition (31). Judgement is made as to whether or not update log data to be processed exists (33). If it is absent, the program execution proceeds to 39, or if the data exists, the block position of the copy data, over which the updated data 25 in the update log data record 19 is to be written, is obtained from physical storage location information 23, and it is judged whether the position is within the range of virtual page in the corresponding update data storage area 11 (34). If the position is outside of the range, the update log data is ignored and the program execution proceeds to (31), or if it is within the range, the updated data is set in the storage area (35). In the example of FIG. 1, a virtual page is determined specifically from a cylinder number, track number and block number. The flag in the update area control table 9 is set to indicate the presence of update log data (37). At (35), if update log data is already set in the same area, it is replaced, and thereafter the program execution proceeds to (31).

In (37), flags in the update area control table 9 are examined in the order of physical arrangement, based on the cylinder, track and block, of the external storage where copy data is stored, e.g., $T_1B_1$ for track 1, block 1, and similarly $T_1B_1$, $T_1B_3$, ..., $T_2B_1$, $T_2B_2$, ..., $T_mB_1$, $T_mB_2$, ..., $T_mB_n$ in cylinder $C_1$, and $T_1B_1$, $T_1B_2$, ..., $T_2B_1$, $T_2B_2$, and so on, in FIG. 1, and if flags indicate the presence of update log data, the update log data which is set in the update data storage area 11 is written sequentially over copy data stored in the external storage (39).

In case the external storage where copy data is stored is a magnetic disk, a command chain for writing blocks, which are included in a cylinder or block, at once is generated, and the data in units of track is delivered to tracks in the same cylinder and next to tracks in the adjacent cylinder. The method of command chain generation is identical to the conventional manner and explanation thereof will be omitted.

In the case of an optical disk, which does not have the concept of cylinder, blocks included on each track are delivered at once.

It is judged whether the foregoing processes have been completed for all update log data in the update data storage area (41). If they are yet uncompleted, the program execution proceeds to 39, or on their completion, the program execution is terminated.

Figure 5:
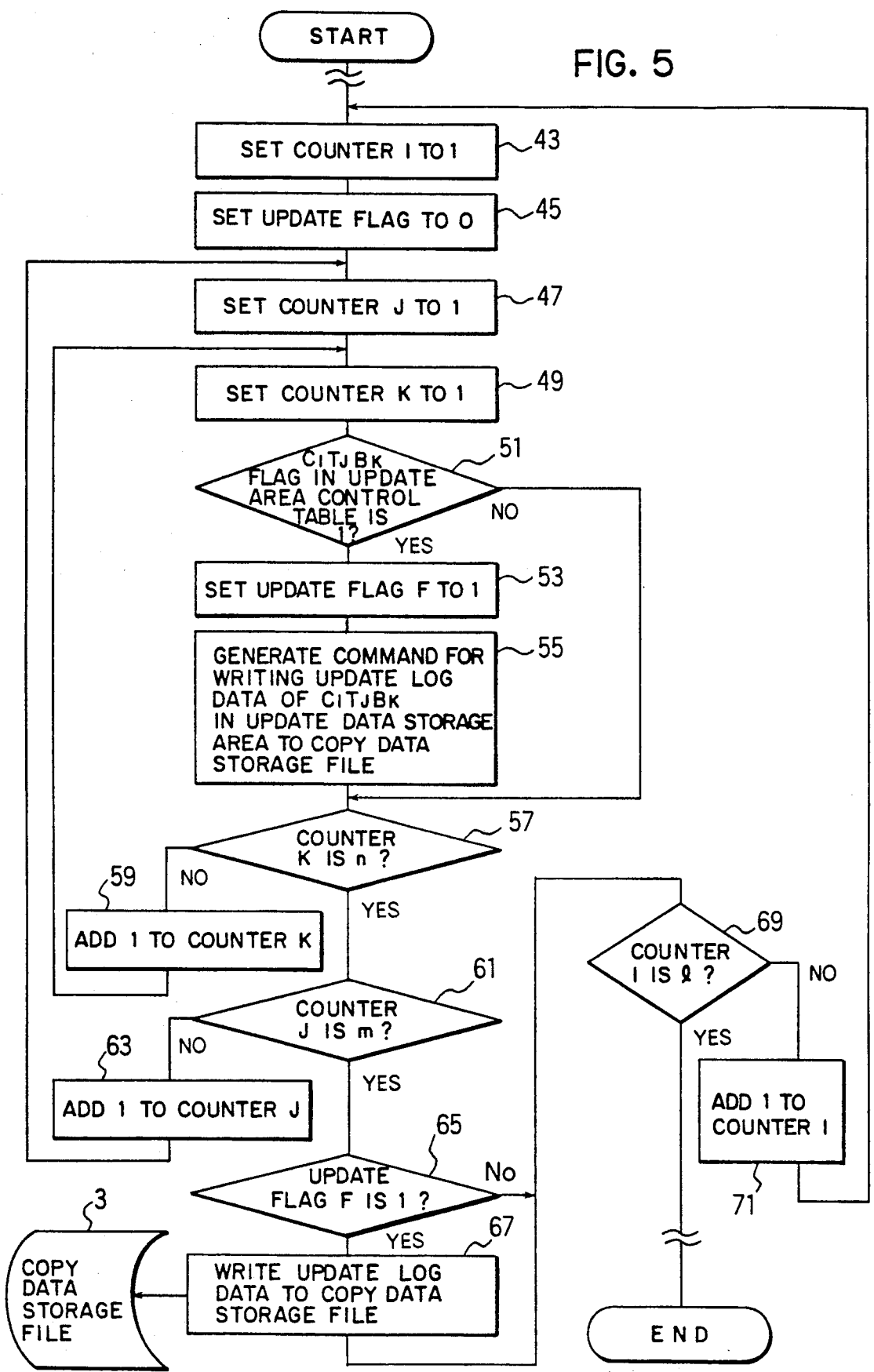
FIG. 5 is a flowchart showing the process of selecting the update log data to be written to the copy data storage file based on the embodiment 1.

The process of 39 which is implemented for each cylinder will be explained in detail with reference to FIG. 5.

A counter 1 for the cylinder number is initialized to 1 (43), and an update flag F, which indicates whether or not update log data needs to be written to the cylinder of that cylinder number in the copy data storage file 3, is initialized to 0 (45). Similarly, a counter J for the track number is initialized to 1 (47), and a counter K for the block number is initialized to 1 (49). As shown in FIG. 1 for example, the maximum cylinder number is l, the maximum track number is m, and the maximum block number is n.

It is judged whether a flag $C_1T_jB_k$ in the update area control table 9 indicates (by being 1 for example) the presence of update log data (51). If the flag does not indicate the presence, the program execution proceeds to 57, or if it indicates the presence, the update flag F is set to 1 (53) and a command for writing the update log data at $C_1T_jB_k$ of the update data storage area 11 to the copy data storage file 3 is generated (55).

It is judged whether the counter K indicates the last block n (57). If it does not indicate n, the counter J is added by 1 (59), and thereafter the program execution proceeds to 49, or if it indicates n, the update flag J is judged whether it indicates the last track m (61). If it does not indicate m, the counter J is added by 1 (63), and thereafter the program execution proceeds to 47, or if it indicates m, the update flag is judged whether it is 1 (65). If the update flag is not 1, the program execution proceeds to 69, or if it is 1, the write command for the update log data generated at 55 is executed so that the data is written over the update log data storage file on all its tracks and in all blocks (67).

Subsequently, the counter 1 is judged whether it indicates the last cylinder (69). If it does not indicate the last cylinder, the counter I is added by 1 (71), and thereafter the program execution proceeds to 43, or if it indicates the last cylinder, the program execution is terminated.

The error processing for the foregoing processes is not a significant concern of the present invention, and its explanation will be omitted.

Based on the foregoing method, among update log data for copy data in the same block, only data which has been aquired latest in its time sequential order is written over the copy data, whereby the I/O time which would be prolonged for a useless write process can be eliminated.

In the conventional method, the update log data is written over the copy data in the time sequential order of its acquisition, resulting in a virtually random location of writing (e.g., cylinder position and track position in the case of a magnetic disk), which compels the actuator to move to a new position at each time. In contrast, according to the inventive method, the update log data is written in units of cylinder and track, preventing the actuator from having a useless movement, whereby the I/O time can be reduced accordingly.

The following describes embodiment 2 of this invention.

Figure 6:
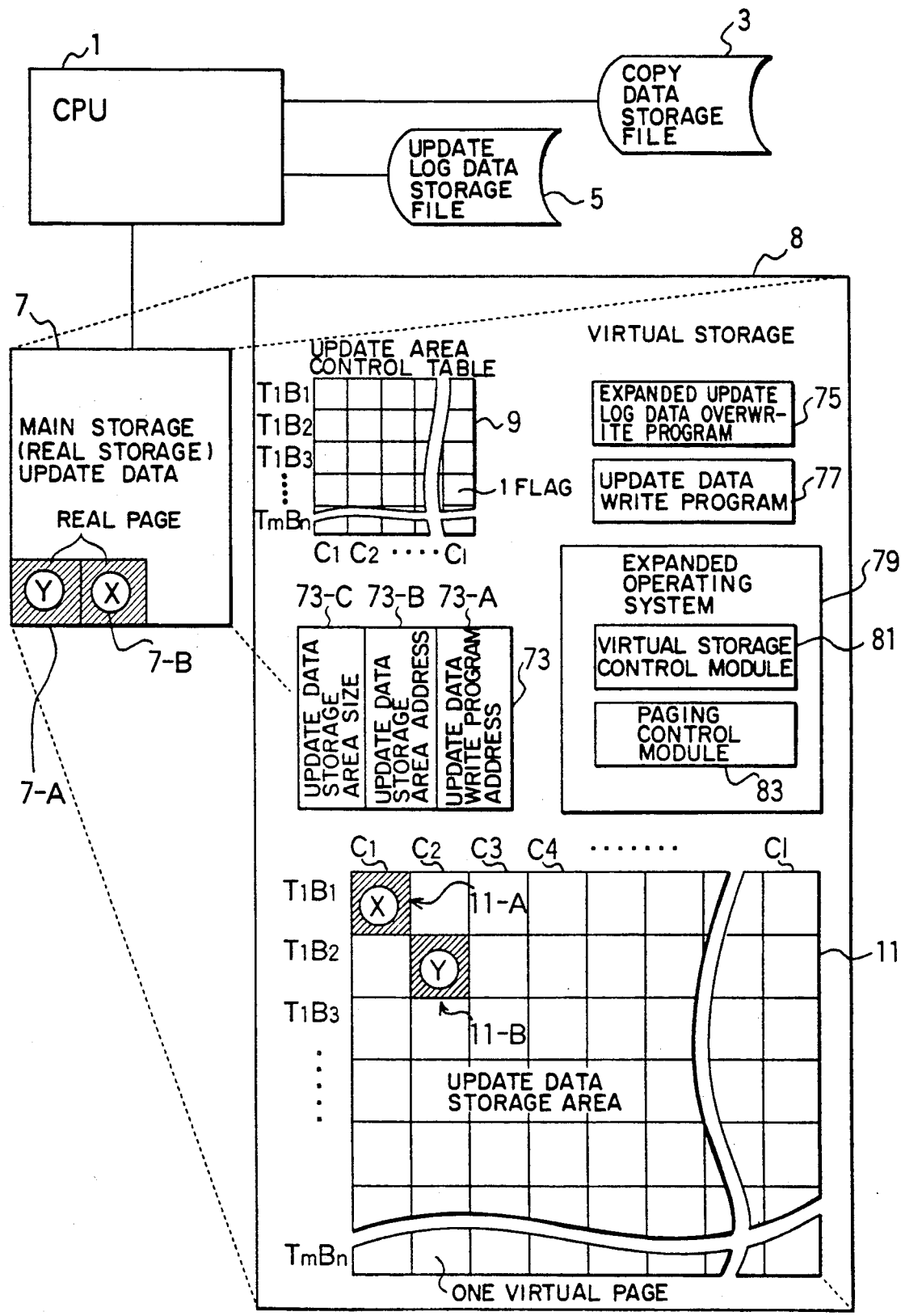
FIG. 6 is a block diagram showing the overall arrangement of embodiment 2 of this invention.

FIG. 6 is a block diagram of the overall arrangement of the embodiment 2.

The embodiment 1 does not consider page-out of the virtual storage where the update log data is set. In order to set the update log data in an area of the virtual storage, the area must have the assignment of real storage. Since the capacity of a database is generally larger than the real storage capacity, it is not possible to assign real storage to the whole database area by such a method as page-fixing.

The present invention resides in the method of assigning real storage only when the update log data is set. Therefore, when the size of area for setting the update log data excluding duplicate areas is smaller than the size of the real storage area, no problem arises in practicing the embodiment 1. However, if both areas have the opposite size relationship, a real storage, which has been assigned to an area in the virtual storage where the update log data is already set, is used for a virtual storage for setting another update log data, resulting in the occurrence of page-out. In the event of page-out, a process for saving the update log data to the paging dataset and a recovery process from the paging dataset for writing the update log data over the same area or writing the data over the copy data are required, resulting in a degraded effectiveness of this invention.

This embodiment differs in the prevention of paging overhead by writing the update log data, which resides in the area of possible page-out, over the copy data and deleting the update log data in that area.

Indicated by 73 is a virtual storage area control table which contains the address 73-B of the virtual storage area reserved as an update log data storage area 11, the size 73-C of the area, and the setting area for the address 73-A of the update data write program 77. 75 is an expanded update log data overwrite program, 77 is an update log data write program, 79 is an expanded operating system, 81 is a virtual storage control module in 79, and 83 is a paging control module in 79.

Next, the processes of the individual programs will be explained.

The process of the expanded update log data overwrite program 75 is the update log data overwrite program 13 in the embodiment 1 added by a process which, when requesting the expanded operating system 79 to get an update log data storage area in the virtual storage, further requests the notification of the area address in the event of page-out to the update log data write program 77. The remaining portion of the program is the same as the preceding program 13, and the explanation thereof will be omitted.

The expanded operating system 79 has the following process in addition to the process of the conventional operating system. The virtual storage control module 81 which controls the assignment of virtual storage areas receives the above-mentioned request from the expanded update log data overwrite program 75 and assigns a virtual storage area as in the conventional manner, as shown in FIG. 7 (85). For the number of cylinders of l, the number of tracks of m, the number of blocks of n, and the size of block of S, the size of the virtual storage area is calculated as $l \times m \times n \times S$. A process (87) is added for setting, to the virtual storage area control table, the address 73-B and size 73-C of the area and the address 73-A of the update data write program 77 which notifies the area in case it is page-out. Moreover, a process (93) is added to the paging control module 83, which controls the assignment and release of real storages to the virtual storage area, a process (93) of, after selecting a page-out area due to the outage of real storage to be assigned to the virtual storage area, judging whether the above-mentioned update log data storage area is included in that area (91) and, if this is true, notifying the address and size of the page-out area by invoking the update log data write program 77 based on the address 73-A, as shown in FIG. 7.

Figure 9:
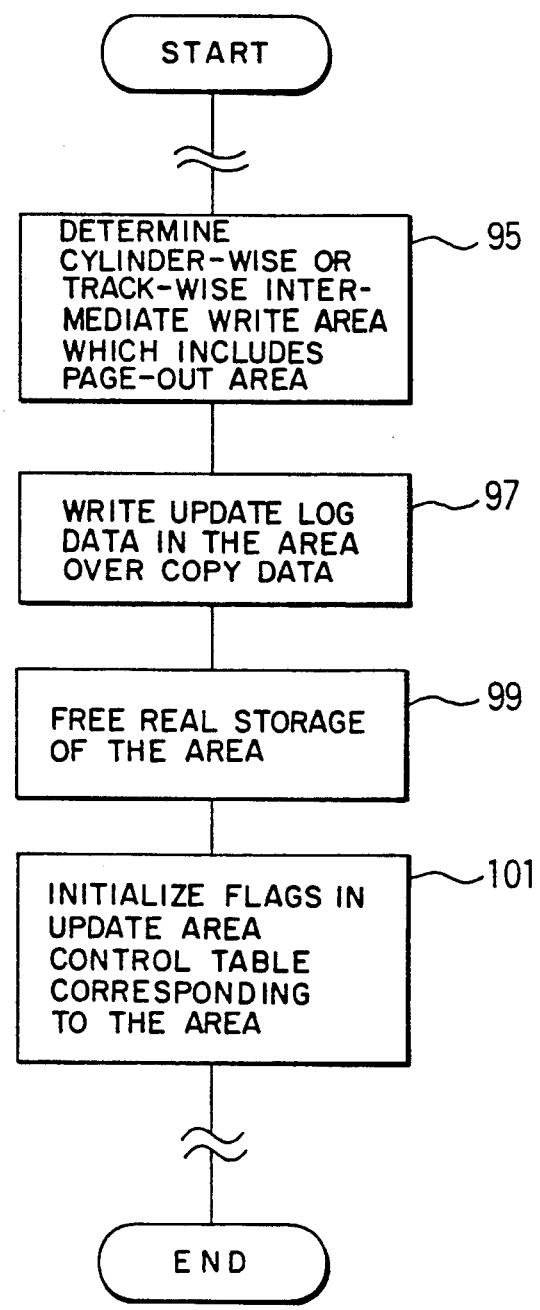
FIG. 9 is a flowchart showing the process of the update data write program based on the embodiment 2.

The update log data write program 77, when it is started, operates as shown in FIG. 9. First, from the notified address and size of the page-out area, an intermediate write area in units of cylinder or track is determined specifically in the update log data storage area including that area (95). For example, for a pageout area starting address X, a size Y, an update log data storage area starting address Z, the number of tracks of m, the number of blocks of n, and a block size S, with $(X-Z)/(m \times n \times S)$ having a quotient of $W_1$ and a residual of $V_1$, with $V_1/(n \times S)$ having a quotient of $U_1$, with $(X+Y-Z)/(m \times n \times S)$ having a quotient of $W_2$ and a residual of $V_2$, and with $V_2/(n \times S)$ having a quotient of $U_2$, the intermediate write area is determined to be from track $U_1$ in cylinder $W_1$ to track $U_2$ in cylinder $W_2$. From the flag in the update area control table corresponding to the intermediate write area, update log data set in that area is retrieved, and the data is written to the external storage where copy data is stored (97). The hardware-based writing to the external storage may be an asynchronous operation.

Next, the real storage which has been assigned to the intermediate write area is feed (99). Consequently, the update log data in this area is deleted from the virtual storage.

After that, the flag in the update area control table corresponding to the intermediate write area is turned to indicate the absence of update log data, i.e., initialized, (101), and the process of this module is completed.

By the foregoing method, in place of page-out for an update log data storage area, the update log data which needs to be written over the copy data sooner or later is written earlier and the real storage of that area is freed, whereby the overhead of paging is prevented and a high-performance overwrite process can be accomplished.

In case further update log data for the overwritten track exists, another overwrite process will be required. Therefore, if the paging avoidance process arises frequently and updating on the same track repeats, the overwrite process will resemble the conventional method, diminishing the effectiveness of the present invention. However, the real storage capacity is growing year by year and the number of occurrences of paging is sufficiently smaller than the number of update log data, and effective functioning of this invention is expected.

The following describes embodiment 3 of this invention.

Figure 10:
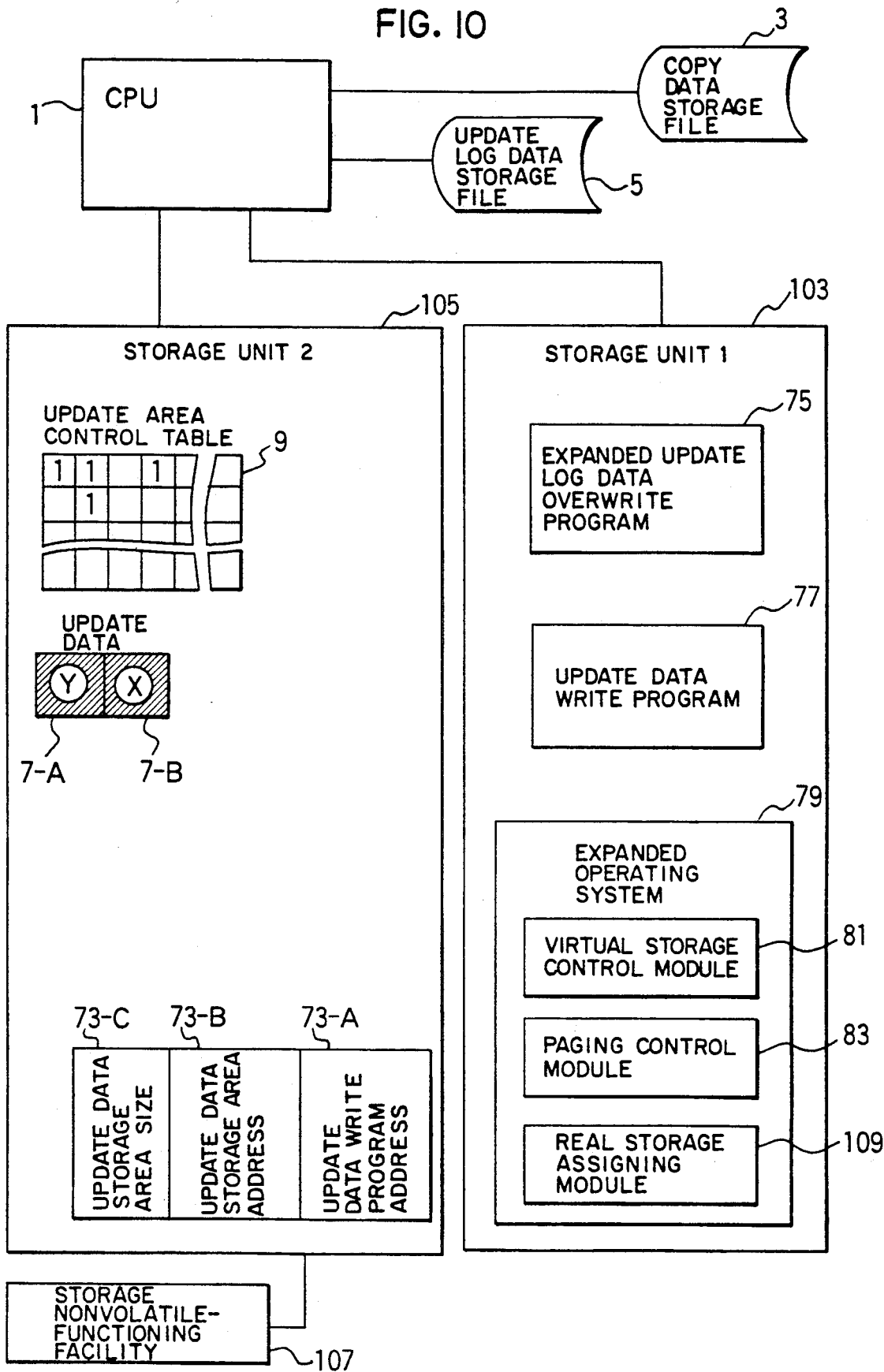
FIG. 10 is a block diagram showing the overall arrangement of embodiment 3 of this invention.
Figure 11:
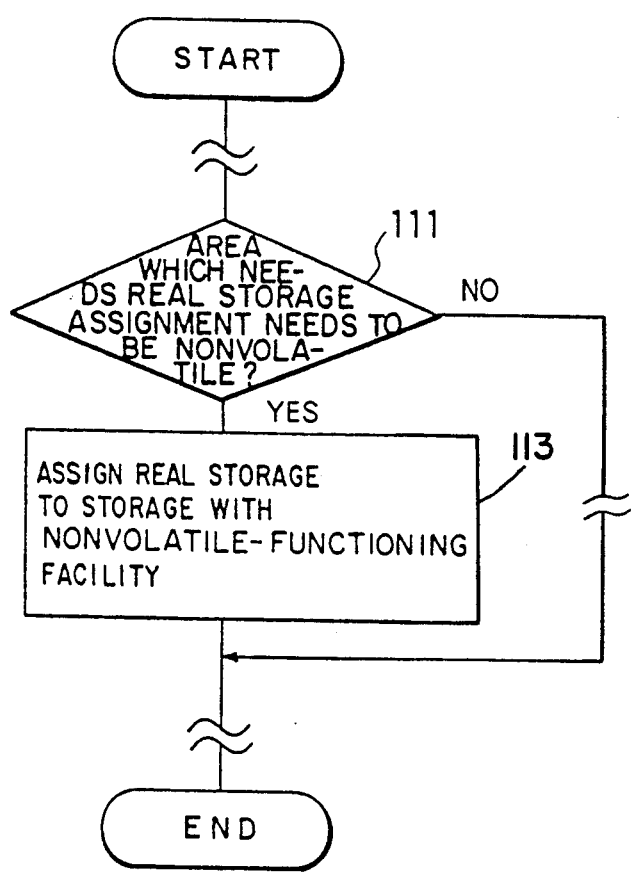
FIG. 11 is a flowchart showing the process of the real storage assignment module based on the embodiment 3.

FIG. 10 is a block diagram of the overall arrangement of the embodiment 3. The virtual storage and its contents are identical to the counterparts of the embodiments 1 and 2. In the embodiments 1 and 2, the real storage assigned to the update area control table, update data storage area and virtual storage area control table is the usual main storage formed of a volatile memory.

In this embodiment, it is assigned to at least the update area control table 9, update data storage area 11, update data write program address 73-A, update data storage area address 73-B, and update data storage area size 73-C. This embodiment differs in the arrangement of the real storage to be a storage 105 having such a nonvolatile-functioning facility 107 as a battery. Indicated by 103 is a storage functioning as a real storage, which is formed of a volatile memory as of the conventional main storage and assigned to an expanded update log data overwrite program 75, update log data writing program 77, expanded operating system 79, etc. in the virtual storage. 105 is a storage functioning as a real storage, which is assigned to the update area control table, update data storage area 11, virtual storage area control table 9, etc. 107 is a memory nonvolatile-functioning facility, such as a battery, for making the storage 105 nonvolatile, and 109 is a real storage assignment module in the expanded operating system 79. Examples of 105 include a nonvolatile main storage and extended storage.

The content of the process is identical to the case of the embodiments 1 and 2, with the addition, to the real storage assignment module in the expanded operating system, of a process (113) for assigning, in the case of the virtual storage area 111 of the update area control table, update data storage area and virtual storage area control table as shown in FIG. 1, their real storage to the storage having the nonvolatile facility (113), and explanation thereof will be omitted.

The foregoing method prevents the update log data from being destroyed at the occurrence of power outage for the main storage, which eliminates the need of recursive overwriting, whereby a highly reliable database, fault recovery process can be accomplished.

The following describes embodiment 4 of this invention.

Figure 12:
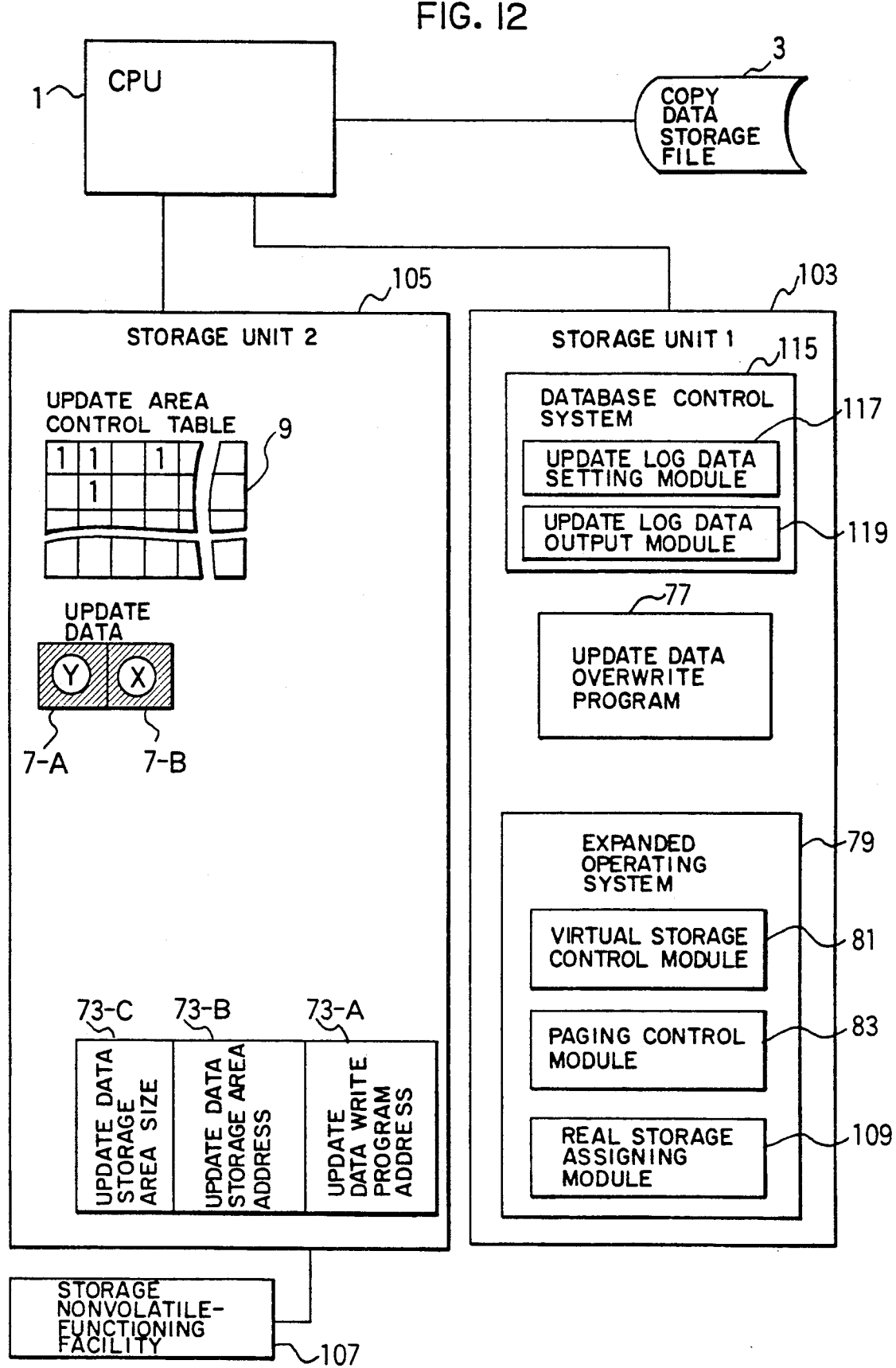
FIG. 12 is a block diagram showing the overall arrangement of embodiment 4 of this invention.

FIG. 12 is a block diagram of the overall arrangement of the embodiment 4. As in the embodiment 3, the virtual storage 8 and its contents are omitted, and in addition, such a portion as a database that is unneedful for the explanation of this invention is also omitted.

The preceding embodiments 1, 2 and 3 are of the case where the update log data is already stored in the external storage. This embodiment differs in the treatment, as a direct object, of the update log data retrieved from the database system.

Indicated by 115 is a database control system, 117 is an update log data setting module, and 169 is an update log data output module.

The following explains the content of the process. First, the database control system 115 transfers the update log data of the database to the update log data setting module.

Figure 13:
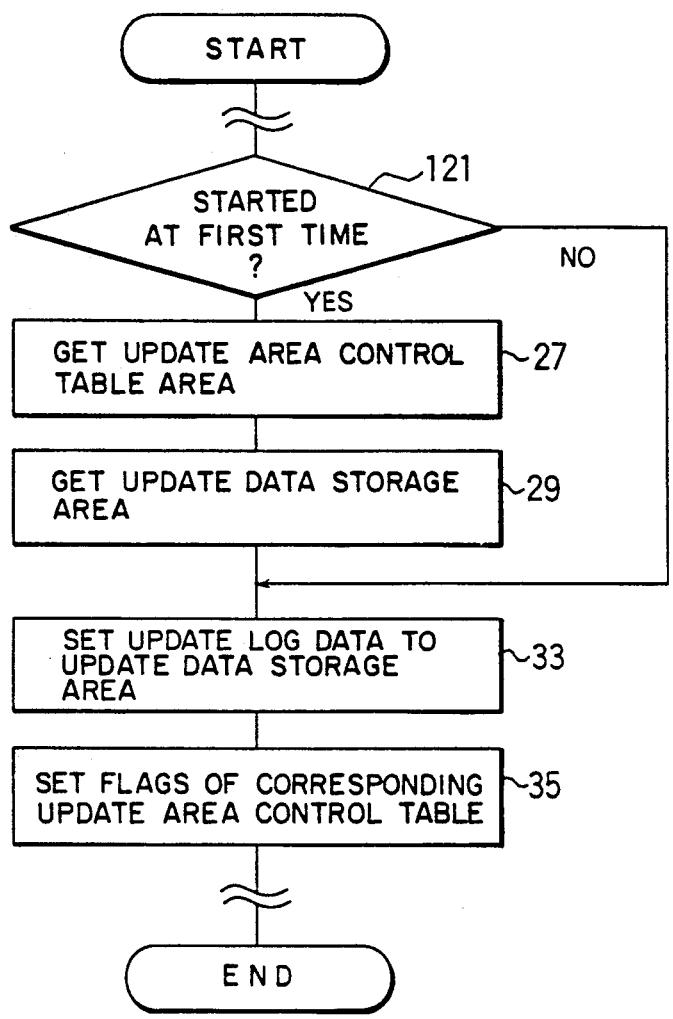
FIG. 13 is a flowchart showing the process of the update log data setting module based on the embodiment 4.

The update log data setting module judges whether the module is activated at the first time (121), as shown in FIG. 13, and only in the case of the first activation, it gets the update area control table 9 and update data storage area 11 in the virtual storage (27, 29), as in the embodiment 1. Subsequently, the module sets the update log data to the update data storage area (33), as in the embodiment 1, and alters the flag in the update area control table corresponding to the area to indicate the presence of update log data (35), and the process of the module is completed.

Figure 14:
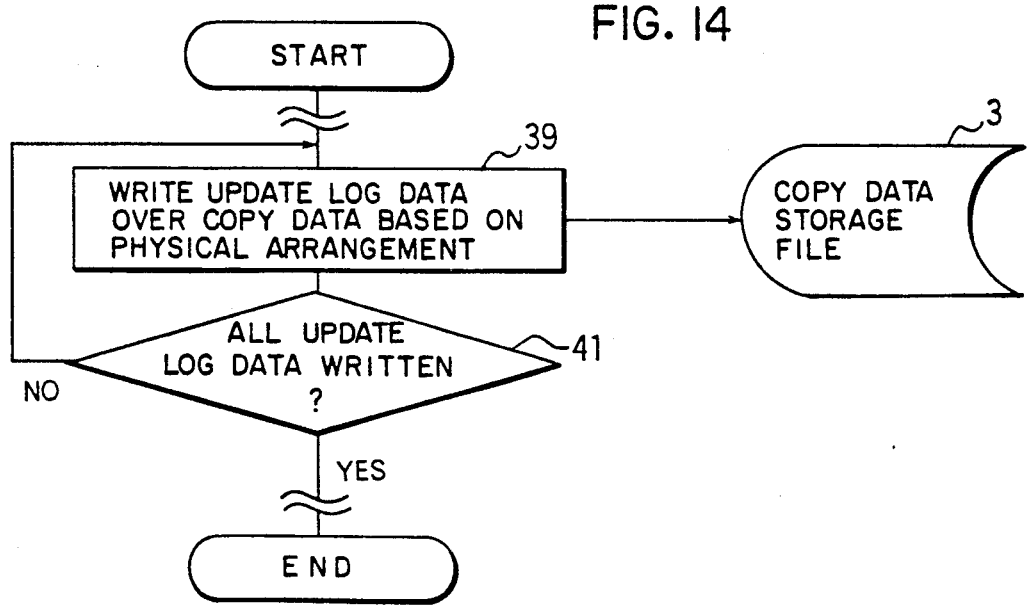
FIG. 14 is a flowchart showing the process of the update log data output module based on the embodiment 4.

The database control system 115 activates the update log data output module at the termination of the system. This module writes all update log data in the update data storage area 11 in units of physical arrangement of blocks n the external storage where copy data is stored (39, 41), as in the case of the embodiment 1, as shown in FIG. 14.

The foregoing process eliminates the need for the process of reading the update log data out of the update log data storage file, as is the case of the embodiments 1, 2 and 3, whereby the time of the overwrite process can further be reduced.

The following describes embodiment 5 of this invention.

Figure 15:
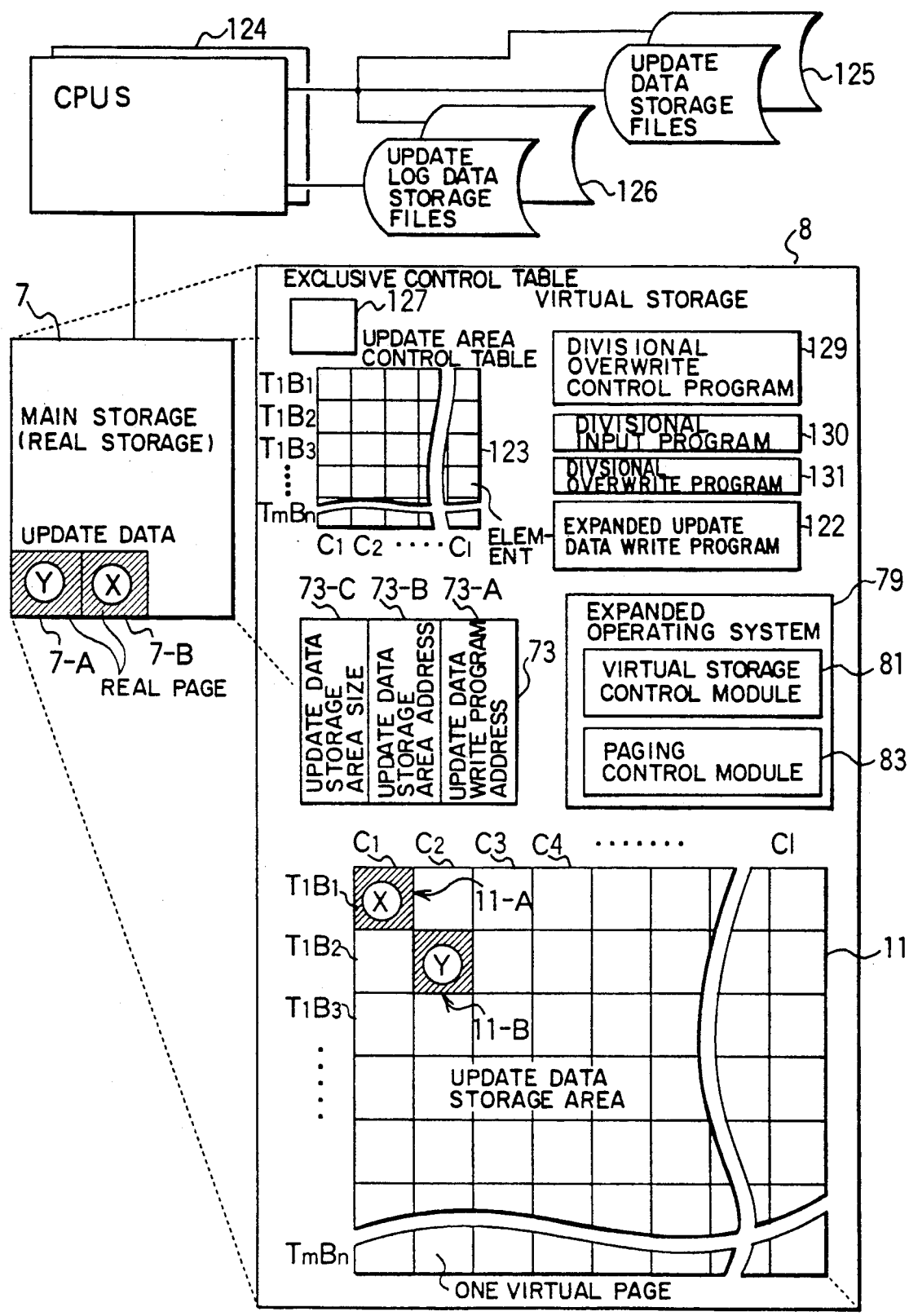
FIG. 15 is a block diagram showing the overall arrangement of embodiment 5 of this invention.

FIG. 15 is a block diagram of the overall arrangement of the embodiment 5.

The embodiments 1 and 2 do not consider the setting of the update log data, which is stored distributively in a plurality of external storages, to areas in the virtual storage for each storage unit in parallel, and the writing of the update log data, which is set in areas of the virtual storage, over copy data, which is stored distributively in a plurality of external storages, for each storage unit in parallel.

This embodiment differs in that the exclusive control process for the update area control table is provided thereby to enter the update log data for each storage unit so that the setting process in the virtual storage is carried out in parallel, and that the writing process of the update log data over the copy data storage file is carried out in parallel.

Consequently, the time for setting the update log data to the virtual storage and overwriting to the copy data storage file can further be reduced. The effectiveness is especially pronounced for a multiprocessor computer system which can run a plurality of tasks concurrently.

Indicated by 123 is an update area control table having fields for setting control values in correspondence to virtual pages in the update data storage area 11. The control values to be set include the update log data acquisition time 132-A which is a value indicative of at least the time sequential relation on the acquisition of the update log data, e.g., the time when the database has been updated. Also included is an update log serial number which is given uniquely to match the order of database updating, or a number which is a combination of an update log serial number for the self computer and update log serial numbers for other computers with the intention of determining specifically the update order of the database which is shared by a plurality of computers, and the update data write-end flag 132-B which indicates in terms of ON or OFF as to whether the update data which is set in the update data storage area is already written in the copy data storage files 125 in place of page-out.

Indicated by 124 is a group of CPUs of a computer system which comprises one or more CPUs. 125 is a group of copy data storage files formed of one or more external storage units where copy data is stored. 126 is a group of update log data storage files formed of one or more external storages where update log data is stored. 127 is an exclusive control table provided for setting a flag indicative of the exclusive use of the update area control table. The procedure for the exclusive use of the update area control table is confirming that the flag is not ON, turning the flag on, making reference and revising the update area control table, and finally turning off the flag.

The exclusive control table may be arranged to contain a single flag, or may contain flags in units of cylinder, track or block of the storage unit to which the copy data storage file is assigned. In case the copy data storage file is formed of a plurality of storage units, with update data storage areas being set correspondingly, the table may be arranged to contain flags for individual units. For the sake of simplicity, the following explanation is based on the example of a single flag. Although the present invention does not confine the method of waiting for the cancellation of exclusive use, this embodiment employs the generally known spin method in which, during the exclusive use, a wait of a certain time length is followed by a retry.

Indicated by 129 is a divisional overwrite control program, 130 is a divisional input program which allows reentrant, and 131 is a divisional overwrite program which allows reentrant.

Figure 16:
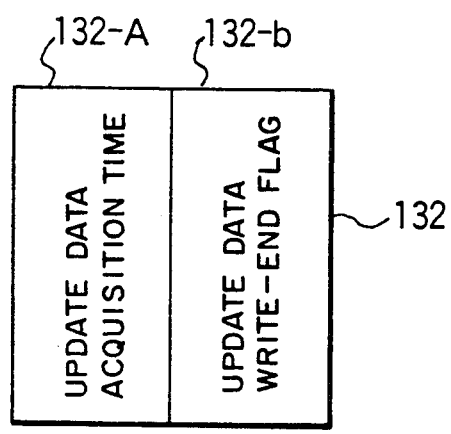
FIG. 16 is a diagram showing the logical arrangement of the element of update area control table based on the embodiment 5.
Figure 17:
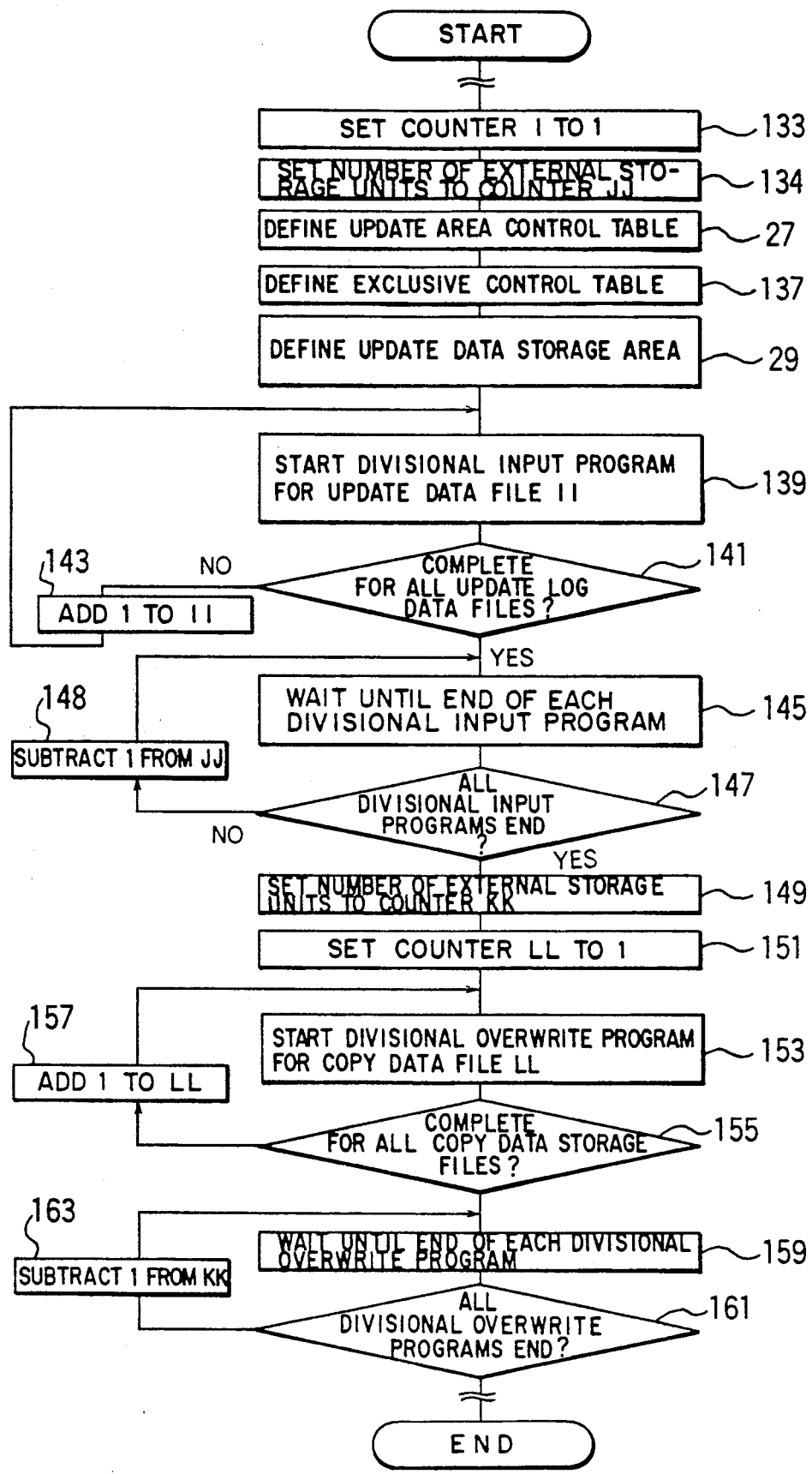
FIG. 17 is a flowchart showing the process of the divisional overwrite control program based on the embodiment 5.
Figure 18:
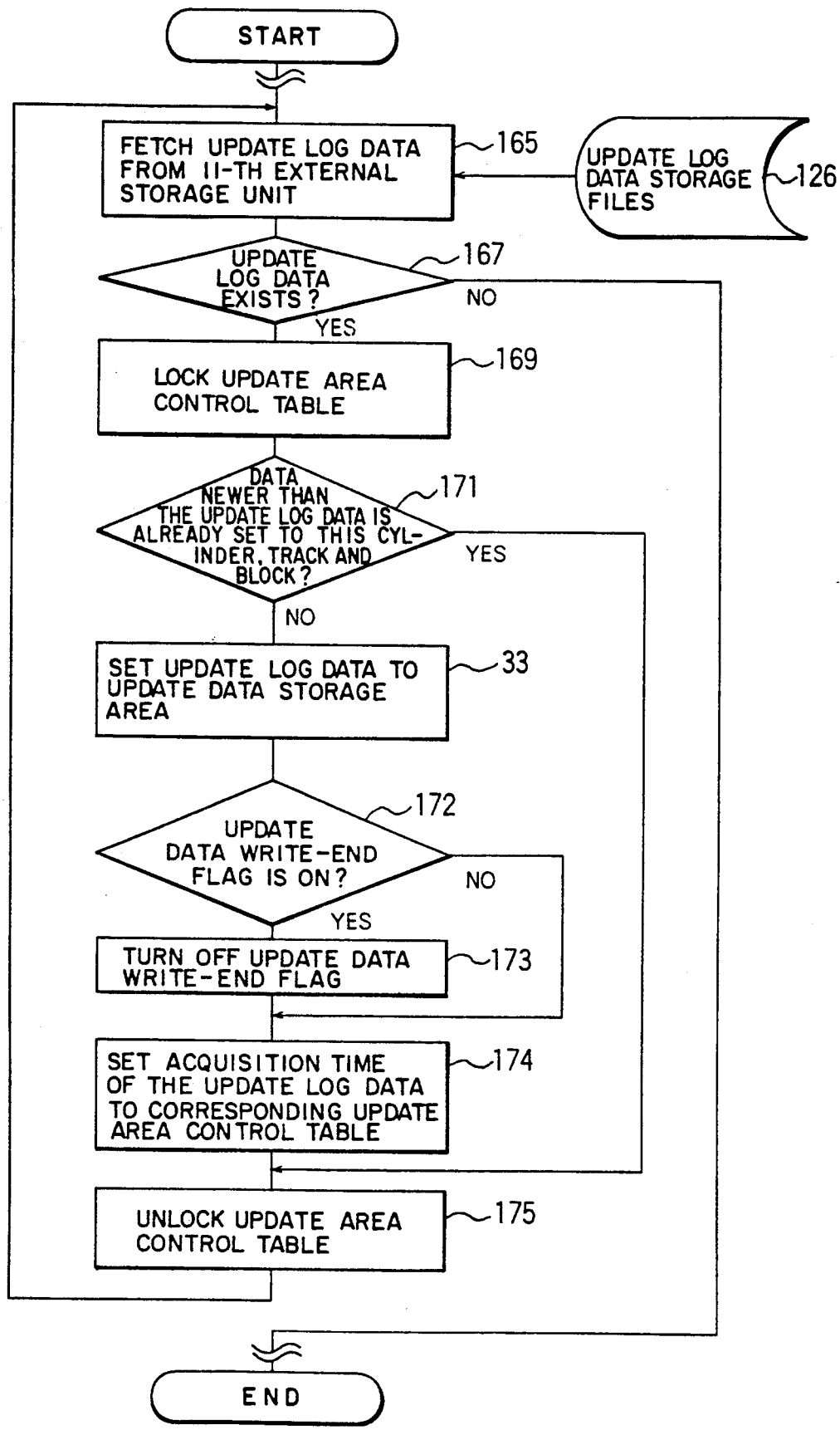
FIG. 18 is a flowchart showing the process of the divisional input program based on the embodiment 5.
Figure 19:
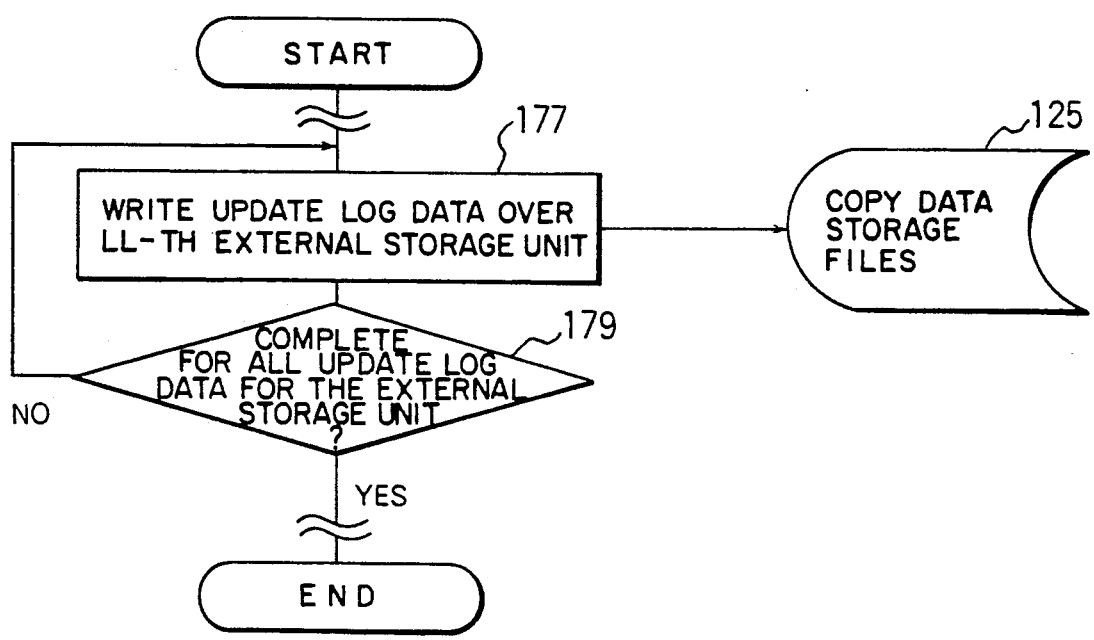
FIG. 19 is a flowchart showing the process of the divisional overwrite program based on the embodiment 5.

Next, the processes of the divisional overwrite control program, divisional input program and divisional overwrite program will be explained with reference to FIGS. 16, 17 and 18, respectively.

When the divisional overwrite control program is started, a variable II, which is a counter for determining an external storage unit where update log data is stored, is initialized to one (133), a variable JJ is initialized to the number of external storages where update log data is stored (134), and a revision area control table 123 is defined in the virtual storage (27). An exclusive control table 127 based on the unit of exclusion of the table is defined in the virtual storage (137). (Similarly, an update data storage area 11 formed of virtual pages equal in number to blocks of copy data is defined in the virtual storage (29).)

In order to execute the update log data input process for the II-th external storage unit where the update log data is stored, the divisional input program is started (139).

Next, it is judged whether the divisional input programs for all external storages where the update log data is stored have been started (141). If the program initiations are uncompleted, the counter II is incremented by one (143), and the program execution proceeds to 139, or if the program initiations have completed, the sequence waits for the end of execution of each divisional input program (145). On completion of execution of each divisional input program, it is judged whether the counter JJ-1 has become zero indicative of the end of execution of all divisional input programs that have been started at 139 (147). If the program executions are uncompleted, the counter JJ is decremented by one (148), and the program execution proceeds to 145, or if the program executions have completed, the number of external storages where copy data is stored is set to the counter KK (149), and a counter LL for specifying the storage is set to one (151). Subsequently, in order to execute the overwrite process for the update log data for the LL-th external storage where the copy data is stored, the divisional overwrite program is started (153).

It is judged whether the divisional overwrite programs for all external storages where copy data is stored have been started (155). If the program initiations are uncompleted, the counter LL is incremented by one (157), and the program execution proceeds to 153, or if the program initiations have completed, the sequence waits for the end of execution of each divisional overwrite program (159). On completion of execution of each program, it is judged whether the counter KK-1 has become zero indicative of the end of execution of all divisional overwrite programs that have been started at 153. If the program executions are uncompleted, the counter KK is decremented by one (163), and the program execution proceeds to 159, or if all program executions have completed, the program execution is terminated.

When the divisional input program is started, a piece of update log data record 19 is read out of the external storage where the II-th update log data is stored as specified by the divisional overwrite control program (165). It is judged whether the update log data record exists (167). If it is absent, the program is terminated, or if the record is present, in order to use exclusively the update area control table corresponding to the update data storage area 11 where the update log data is set, the flag of the exclusive control table for that table is turned on thereby to lock the update area control table (169).

In order to limit the range of locking for the update area control table, a flag of the exclusive control table is determined specifically from physical storage location information 23 in the update log data record 19, in the case of providing flags of the exclusive control table in units of cylinder, track and block. When a flag is already ON, the sequence waits unitl the flag turns off, at which point the flag is turned on and the following process is executed.

Next, it is judged whether the control value for the physical storage location of the update data (the time of acquisition of the update data) in the update area control table is newer than information indicative of the time sequential relation on the acquisition of the update log data record (represented by the acquisition time in this embodiment) 21 (171). If it is found to be newer one, the program execution proceeds to 175, or if it is older one, the update log data is set in the update data storage area 11 (33).

Next, it is judged whether or not the update data write-end flag 132-B in the corresponding update area control table 123 is ON (172). If it is OFF, the program execution proceeds to 174, or if it is ON, the update data write-end flag is turned off (173) and thereafter the time of acquisition of the update log data is set to the update data acquisition time field 132-A of the update area control table (174).

Next, in order to unlock the update area control table, the flag in the exclusive control table is turned off (175), and thereafter the program execution proceeds to 165.

When the divisional overwrite program is started, the update log data in the update data storage area for the external storage, where the LL-th copy data is stored as specified by the divisional overwrite control program, is arranged in units of track and overwritten to the external storage in the order of cylinder and track in compliance with the physical arrangement order of the external storage (177), as in the embodiment 1. In the embodiment 1, update log data in the update data storage area, with values of fields in the update area control table 9 being ON, is selected to output, whereas in this embodiment, the update log data in the update data storage area, with the update data acquisition time 132-A being set and update data write-end flag 132-B being OFF, is selected to output.

It is judged whether all update log data in the update data storage area for the external storage is completed for overwriting (179). If it is uncompleted, the program execution proceeds to 177, or if it is complete, the program is terminated.

Figure 20:
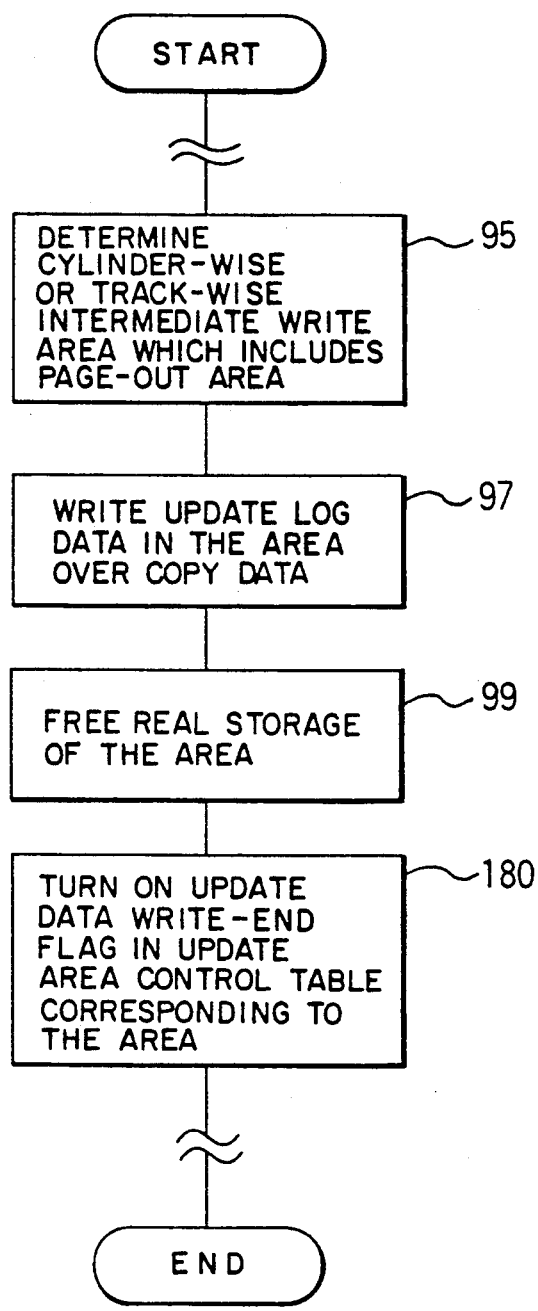
FIG. 20 is a flowchart showing the process of the expanded update data write program based on the embodiment 5.

The expanded update data write program 122 is the update data write program 77 shown in FIG. 9, with the process 101 being replaced with the process 180 of turning on the update data write-end flag 132-B in the update area control table 123 corresponding to the intermediate write area, as shown in FIG. 20.

By the foregoing method, in case the update log data is stored distributively in a plurality of external storages, the input time is reduced from the total value of input times of all storage units to the longest time among update log data inputs from one storage unit. In case the copy data is stored distributively in a plurality of external storages, the overwriting time to the storages is reduced from the total value of overwriting times to all storage units to the longest overwriting time among update log data to one storage unit.

For the case of sharing a database among a plurality of processors, there is a method of writing into separate external storages in correspondence to transactions, in order to store the update log data in a different external storage or write the update log data to an external storage at a high speed. In this case, conventionally, before the update log data stored in a different storage unit is written over the copy data, it is processed for the rearrangement in the time sequential order of database updating. According to this invention, this rearrangement process is unneeded, whereby the database operation is simplified, and reduction of the database fault recovery time and database multiplexing with retardation are accomplished by duplication production through the writing of the update log data over the copy data.

The following describes embodiment 6 of this invention.

Figure 21:
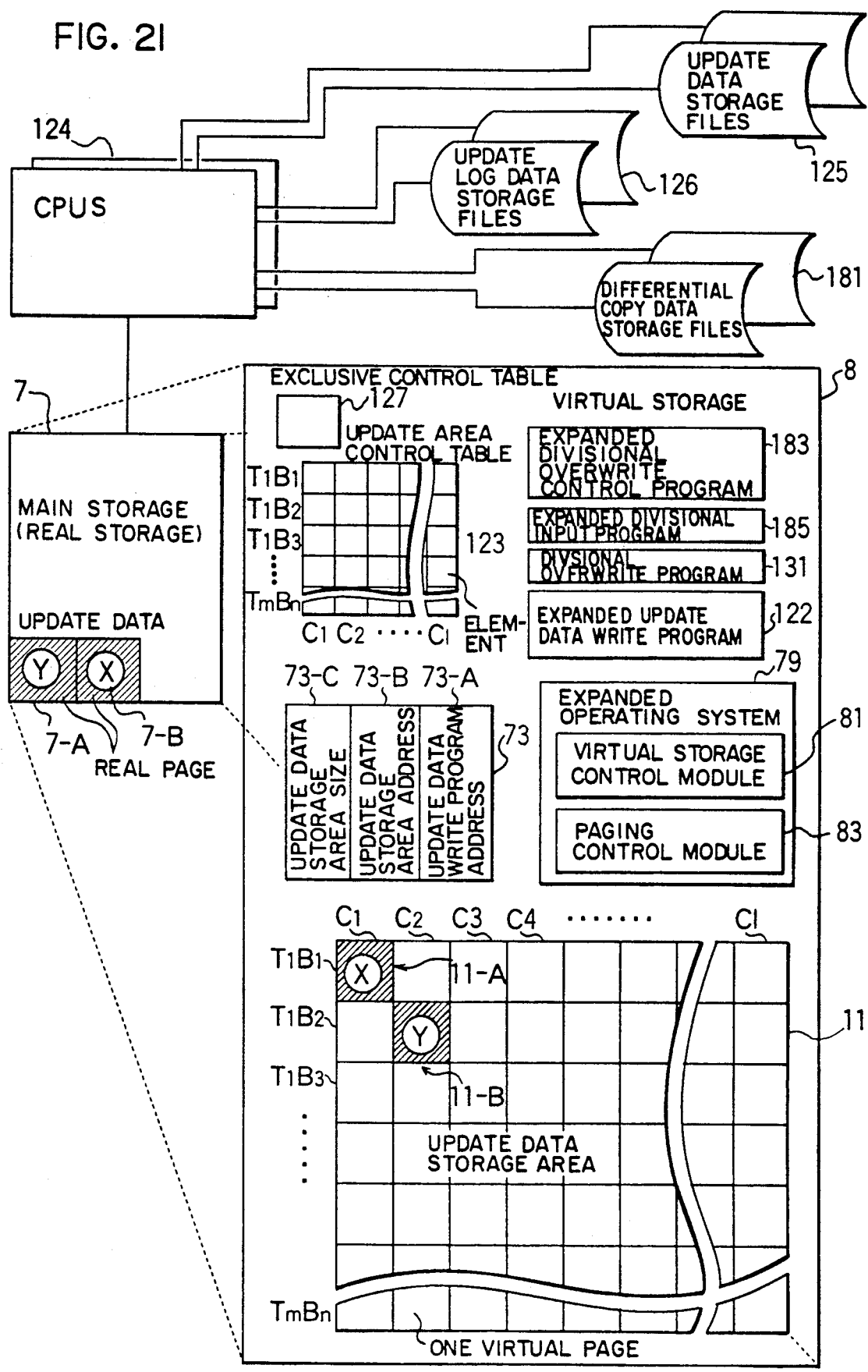
FIG. 21 is a block diagram showing the overall arrangement of embodiment 6 of this invention.

FIG. 21 is a block diagram of the overall arrangement of the embodiment 6.

The embodiments 1 through 5 are of the case based on the database recovery method in which update log data of a database is written over copy data called whole copy thereby to restore the database contents before a fault has occurred, and they do not consider a method of database duplication production in which copy data for only updated portions of the database in one period called differential copy is written over the whole copy and thereafter the database update log data is written over it thereby to restore the database contents before the occurrence of a fault.

This embodiment is designed to set a differential copy existing on a plurality of planes in the update data storage area defined in virtual storage, and next the update log data of the database is set, and thereafter the data is written in units of track and cylinder over the file where the whole copy is stored.

Consequently, duplicate I/O processes for the same cylinder and track by the writing process for the differential copy over the whole copy and the overwrite process for the database update log data can be prevented from occurring, and the recovery time can further be reduced. The effectiveness is especially pronounced in the case of writing a plurality of differential copies over the whole copy.

Indicated by 181 is a group of differential copy data storage files where differential copy is stored. A plurality of differential copies may exist for one whole copy. Namely, after the acquisition of the whole copy, differential copies may exist equal in number to the number of periods in which only updated portion is copied dividedly.

183 is an expanded divisional overwrite control program, and 185 is an expanded divisional input program.

Figure 22:
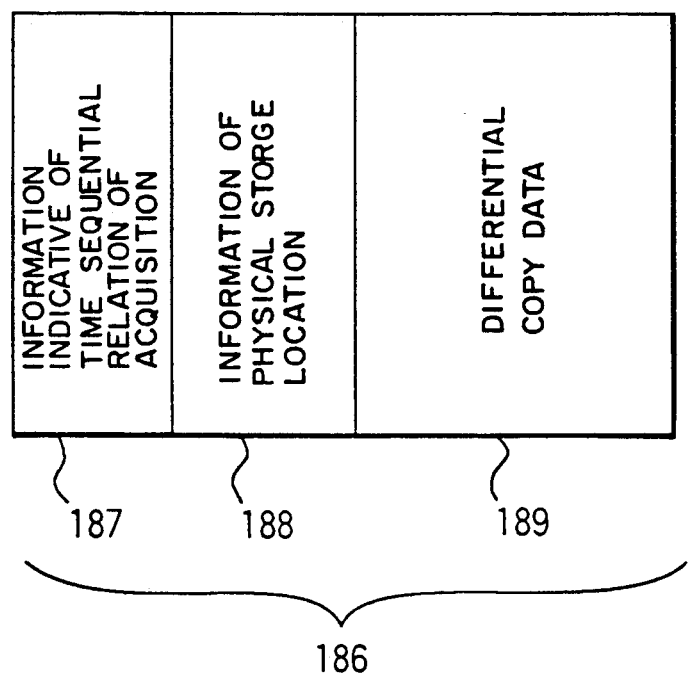
FIG. 22 is a diagram showing the logical arrangement of the record of differential copy data based on the embodiment 5.

An example of the logical arrangement of the differential copy data will be explained with reference to FIG. 22. The differential copy data is registered in the differential copy data storage file 181 in the form of block-wise or track-wise records 186. Each record includes information 187 which expresses the time sequential relation on the acquisition of the differential copy data, e.g., the time of updating of a portion that has been updated last among differential copies, and the update log serial number which is going to be given to the update log data for the first database updating after the differential copy has been acquired. Also included is the update log serial number given to the update log data for the last updating immediately before the differential copy is acquired, or a number which is the combination of the update log serial number for the self computer and update log serial numbers for other computers with the intention of determining specifically the update order of the database which is shared by a plurality of computers, physical storage location information 188 for the differential copy data, and the differential copy data 189.

As another example of differential copy data, individual differential copy data records are not provided with values indicative of their time sequential relation, but they have the same value. Control data is recorded for each group of differential copy data, and if a value indicative of the time sequential relation is needed for one differential copy data, the control data is referenced.

Although the differential copy data is a collection of database update data, as is the case of the database update log data, values indicating their time sequential relation are given at once as if the database has been updated at the time of acquisition of the differential copy data and in such a fashion of indicating the time sequential relation with the database update history.

In order to determine the time sequential relation between the differential copy data and update log data, there are two methods. One method is to issue a update log serial number without duplication for the differential copy data and update log data, and another method is to issue an update log serial number immediately before or after the acquisition of the differential copy data to the differential copy data, as in the abovementioned example, and to determine the time sequential relation between the differential copy data and update log data on the basis of a set of the type of update data and the value indicative of the time sequential relation. The former method is capable of processing without the distinction between the differential copy data and update log data, as in the embodiments 1 through 5. However, an update log serial number given to the differential copy data will be absent in other application of only update log data, and a process for judging it to be a reasonable absent number or an absent number due to error is required. The latter case is assumed for this embodiment, and the following describes the database recovery method which considers the time sequential relation between the differential copy data and update log data.

Figure 23:
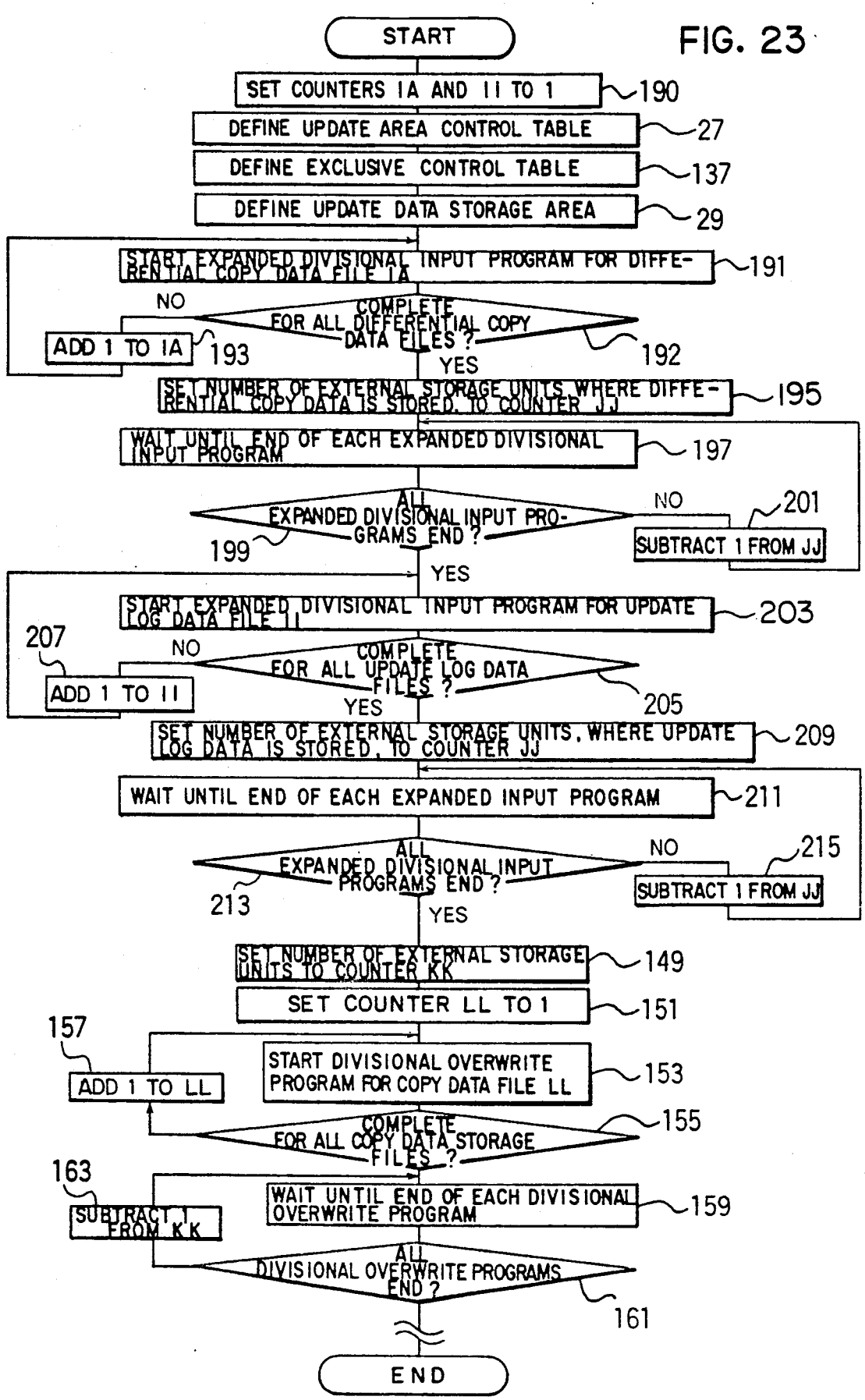
FIG. 23 is a flowchart showing the process of the expanded divisional overwrite control program based on the embodiment 6.
Figure 24:
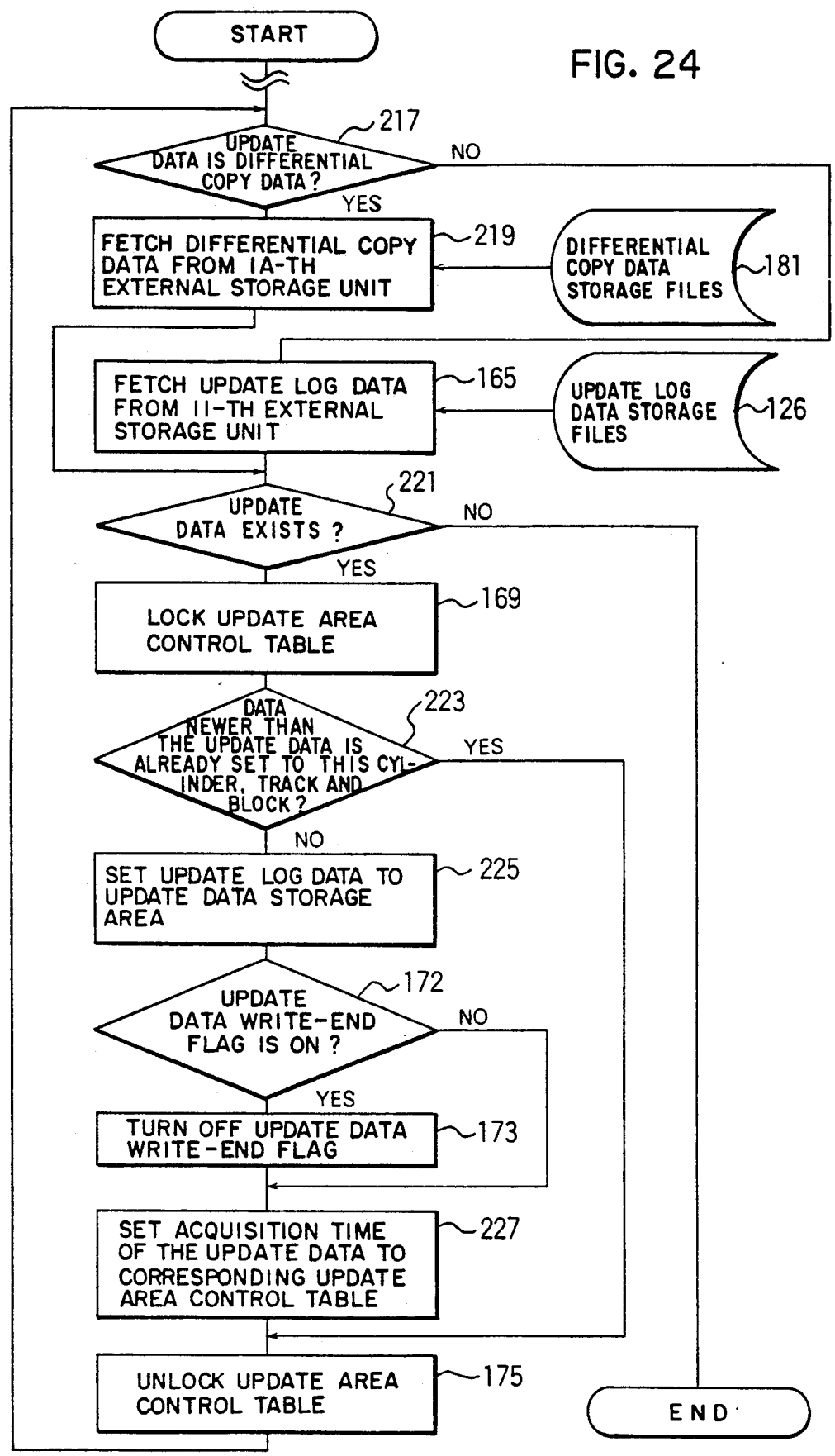
FIG. 24 is a flowchart showing the process of the expanded divisional input program based on the embodiment 6.

The processes of the expanded divisional overwrite control program 183 and expanded divisional input program 185 will be explained with reference to FIGS. 23 and 24, respectively. The processes of other programs are identical to the embodiment 5, and their explanation will be omitted.

When the expanded divisional overwrite control program is started, a variable IA, which is a counter for determining an external storage where the differential copy data is stored, and a variable II, which is a counter for determining an external storage where the update log data is stored, are set (187), and an update area control table 123 is defined in virtual storage (27). Based on the unit of exclusion of the table, an exclusive control table 127 is defined in the virtual storage (137). Similarly, an update data storage area 11 formed of virtual pages equal in number of blocks of whole copy data is defined in the virtual storage (29).

In order to execute the input process for the differential copy data for the IA-th external storage, the expanded divisional input program is started (189). Next, it is judged whether or not expanded divisional input programs for all external storages where the differential copy data is stored have been started (191). If the program initiations are uncompleted, the counter 1A is incremented by one (193), and the program execution proceeds to 189, or if the program initiations have completed, the number of external storages where the differential copy data is stored is set to the counter JJ (195), and the sequence waits until the end of execution of each divisional input program (197). On completion of execution of each expanded divisional input program, it is judged whether the counter JJ-1 has become zero, indicative of the end of executions of all expanded divisional input programs that have been started at 189 (199). If the program executions are uncompleted, the counter JJ is decremented by one (201), and the program execution proceeds to 197, or if the executions have completed, the expanded divisional input program is started in order to execute the input process for the update log data for the II-th external storage (203). It is judged whether or not the expanded divisional input programs for all external storages where the update log data is stored have been started (205). If the program initiations are uncompleted, the counter II is incremented by one (207), and the program execution proceeds to 203, or if the program initiations have completed, the number of external storages where the update log data is stored is set to the counter JJ (209), and the sequence waits until the end of execution of each divisional input program (211). On completion of execution of each expanded divisional input program, it is judged whether the counter JJ-1 has become zero indicative of the end of executions all expanded divisional input programs that have been started at 203 (213). If the program executions are uncompleted, the counter JJ is decremented by one (215), and the program execution proceeds to 211, if the executions have completed, the program execution proceeds to 149. The process of 149 and after that are identical to the process of the divisional overwrite control program in the embodiment 5 shown in FIG. 17, and the explanation thereof will be omitted.

When the expanded divisional input program is started, it is judged whether or not the update data entered by being specified by the divisional overwrite control program is differential copy data (217). If it is differential copy data, a piece of differential copy data record 186 is read out of the external storage where the IA-th differential copy data is stored (219), or if it is not differential copy data, a piece of update log data record 19 is read out of the external storage where the II-th update log data is stored (165). It is judged whether or not the differential copy data record 86 or update log data record 19 (will be termed update data hereinafter) exists (221). If it is absent, the program is terminated, or if it is present, the flag in the update area control table corresponding to the update data storage area 11 where the update data is to be stored is turned on so as to lock the update area control table (169). Subsequently, if the control value in the update area control table, which is the control value for the physical storage location of the update data, is newer than the time of acquisition of the update data. In the case of differential copy data, information 189 indicative of the time sequential relation on the acquisition of the differential copy data is set, or in the case of update log data, information 21 indicative of the time sequential relation on the acquisition of the update log data is set. For both cases, it will be termed the update data acquisition time. Then the program execution proceeds to 175. If the control value is older, the update data is set in the update data storage area 11 (225). It is judged whether or not the update data write-end flag 132-B in the corresponding update area control table 123 is ON (172). If it is OFF, the program execution proceeds to 227, or if it is ON, the update data write-end flag is turned off (173), and thereafter the acquisition time of the update data is set in the update data acquisition time field 132-A of the corresponding update area control table (227). Next, in order to unlock the update area control table, the flag in the exclusive control table is turned off (175), and thereafter the program execution proceeds to 217.

In case the update data which is intended to set in the update data storage area is differential copy data acquired in units of track, the processes from 221 to 175 are carried out for each block of track for the piece of differential copy data record entered at 219.

By the foregoing method, in case the differential copy data and update log data of the database are written over the whole copy data, differential copy data and update log data of the same cylinder and track are gouped in units of track which is the unit of I/0, and those in the same block are reduced to only the latest updated content, thereby reducing the number of tracks to be written, and moreover, while conventionally the differential copy data and update log data are written separately, causing the actuator to scan the storage at each writing, the present invention completes writing for both data in only one scan and the write time can be reduced.

Moreover, in case differential copy data exists on a plurality of planes, they are conventionally read out of the differential copy data storage file and written over the whole copy data sequentially in accordance with the time sequential relation on their acquisition, whereas this embodiment of invention can deal with parallel input for the differential copy data, and the input time can be reduced accordingly.

By setting only a plurality of differential copy data as update data in the update data storage area which is defined in the virtual storage, instead of dealing with the update log data of the database and controlling the process of the expanded divisional overwrite control program in the embodiment 6 so that the data is written over the whole copy at once, it is possible, for the purpose of the retrieval of the database contents at one time point or prior merging of the differential copy data with the whole copy for the readiness against the database fault, to write the differential copy data up to that time point over the whole copy at a high speed.

The following describes embodiment 7 of this invention.

Figure 25:
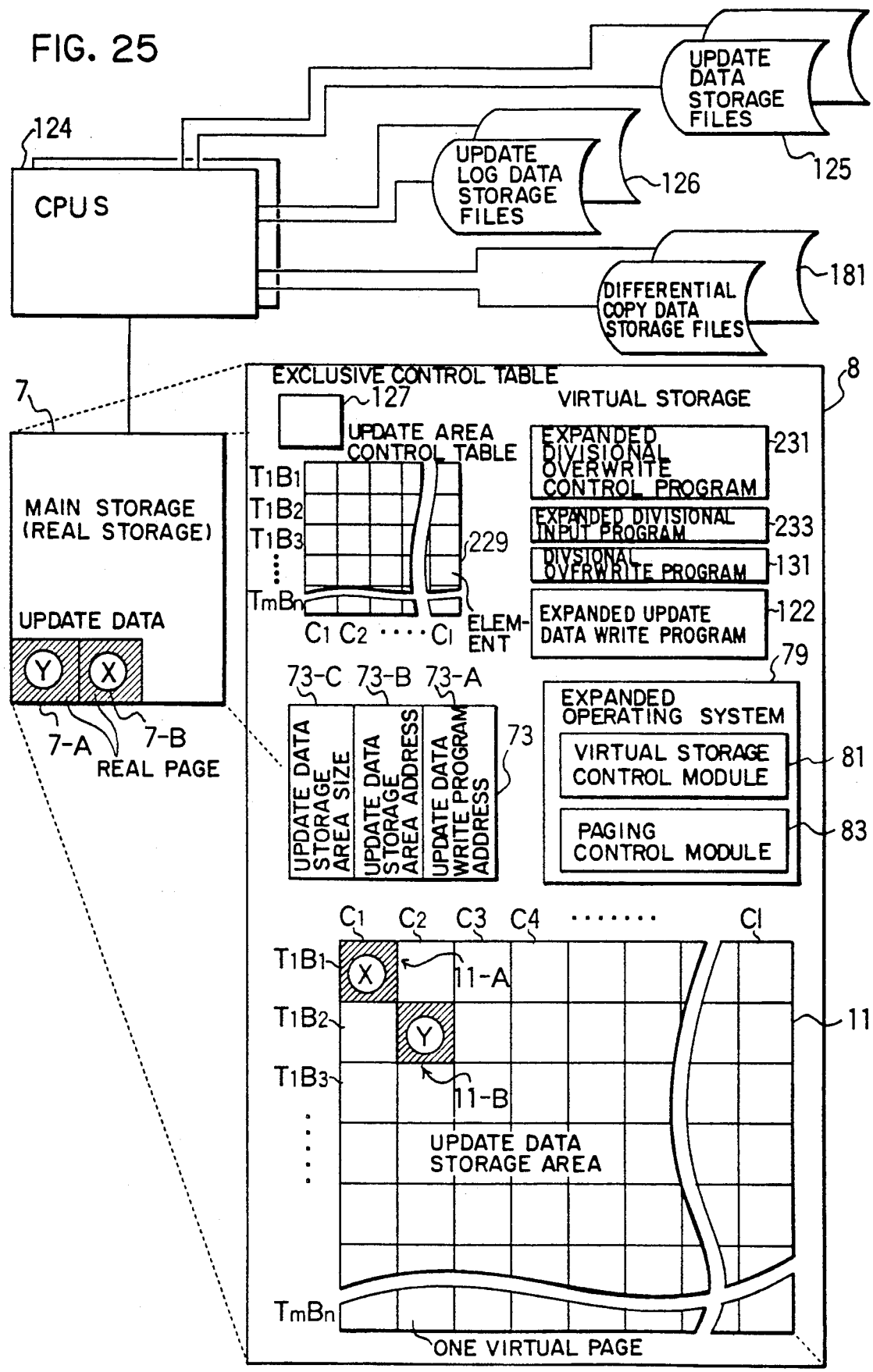
FIG. 25 is a block diagram showing the overall arrangement of embodiment 7 of this invention.

FIG. 25 is a block diagram of the overall arrangement of the embodiment 7.

In the embodiment 6, the update log data is entered to the main storage after the differential copy data has been entered to the main storage, and it does not consider the parallel input for both update data.

This embodiment differs in that the update area control table is provided with a field for setting the type of update data which is set in the update data storage area, and that a process for determining the time sequential relation between the differential copy data and update log data is provided, so that the input process of the differential copy data and database update log data to the main storage or extended storage is carried out in parallel.

Consequently, the prolonged execution time caused by the input wait can be alleviated as compared with the case of the sequential input process for the differential copy data and the input process for the database update log data. Particularly, when the parallel input based on multiple processors is allowed, the total input time can be reduced from the total of the input time of differential copy data and the input time of database update log data to the longest of input times among storage units where the differential copy data and database update log data are stored.

Figure 26:
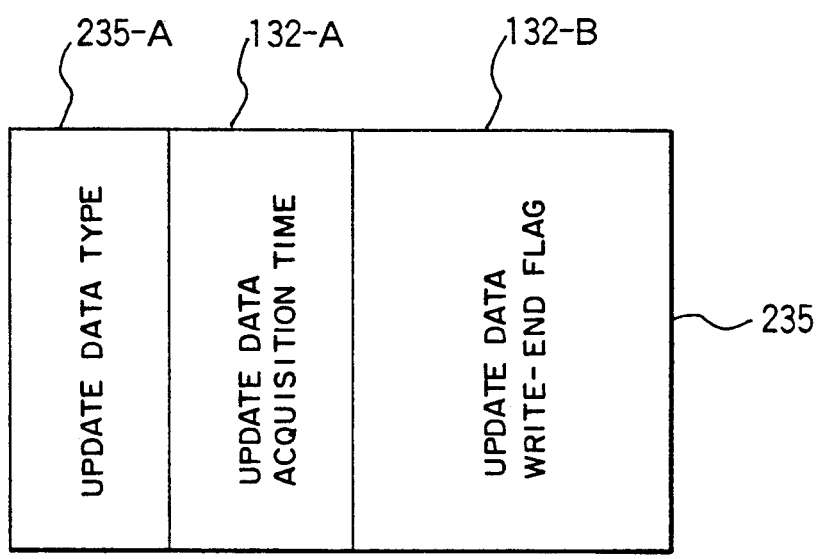
FIG. 26 is a diagram showing the logical arrangement of the element of update area control table based on the embodiment 7.

Indicated by 229 is an update area control table, and it comprises a field 132-A for setting a value indicative of the time sequential relation of update data which is set in the update data storage area, an update data write-end flag field 132-B, and a field 235-A for setting a value indicative of the type of update data, i.e., differential copy data or update log data, as shown in FIG. 26. 231 is an expanded divisional overwrite control program, and 233 is an expanded divisional input program.

Figure 27:
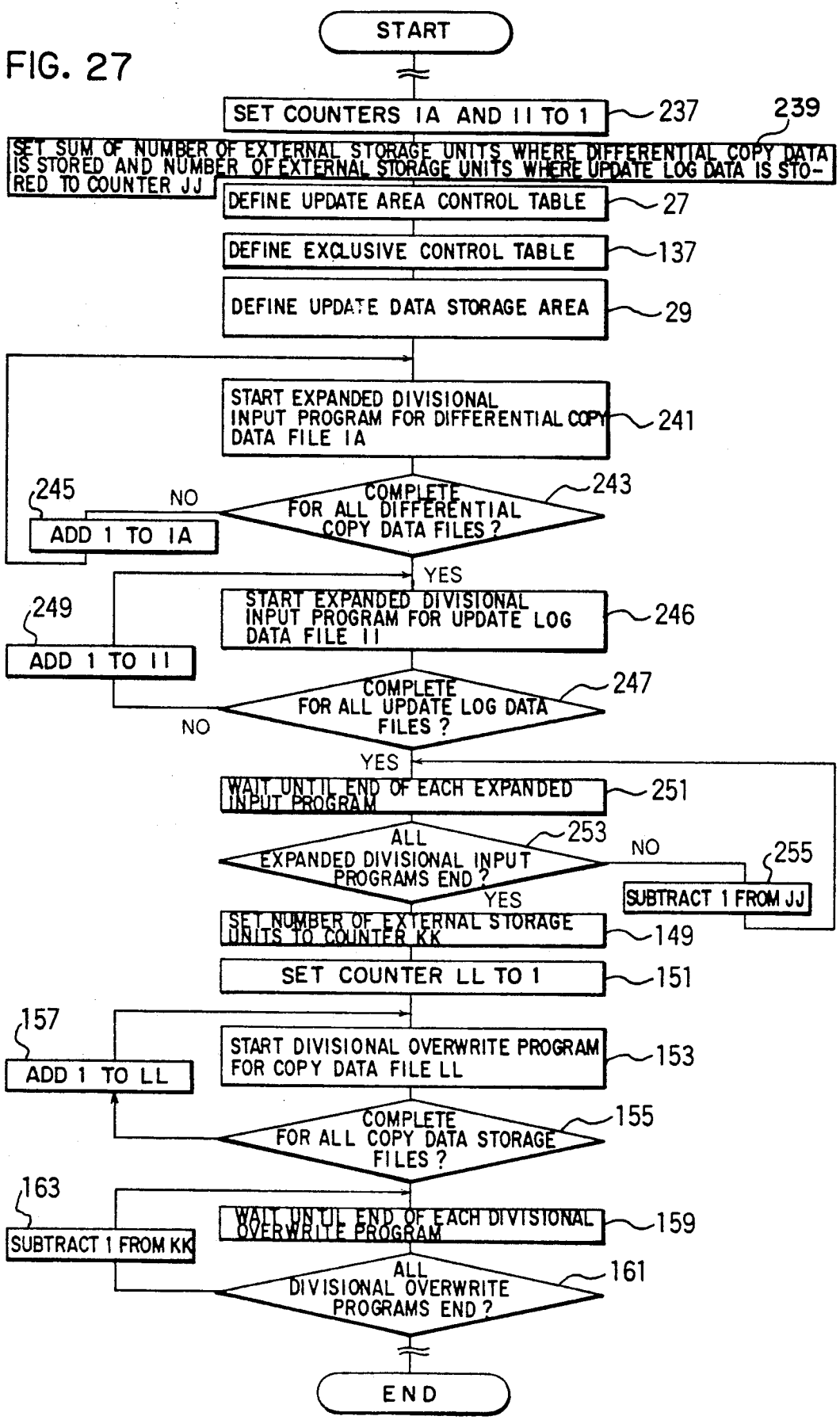
FIG. 27 is a flowchart showing the process of the expanded divisional overwrite control program based on the embodiment 7.
Figure 28:
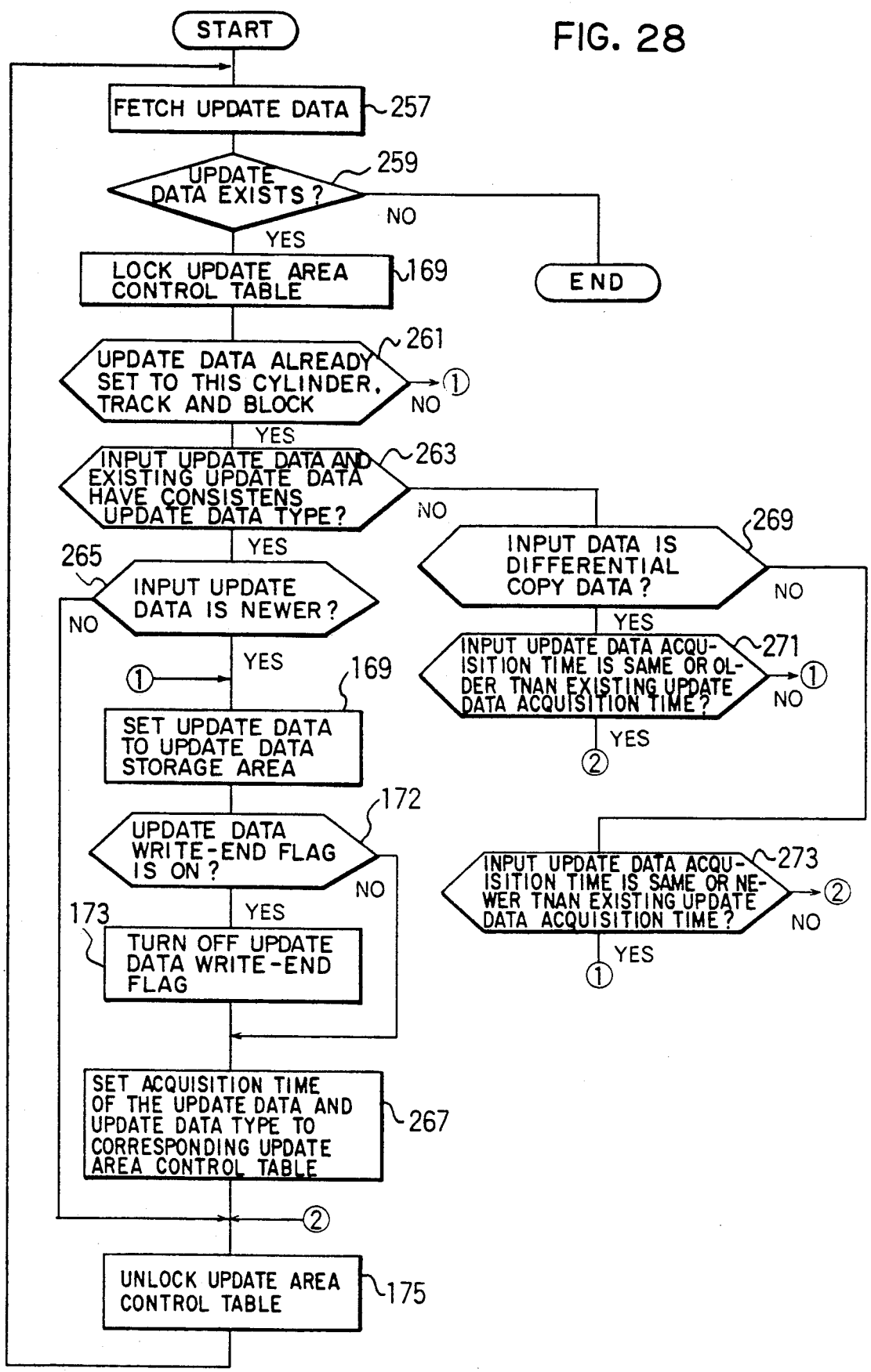
FIG. 28 is a flowchart showing the process of the expanded divisional input program based on the embodiment 7.

Next, the processes of the expanded divisional overwrite control program 231 and expanded divisional input program 233 will be explained with reference to FIGS. 27 and 28, respectively. The processes of remaining programs are identical to the embodiment 6, and explanation thereof will be omitted.

When the expanded divisional overwrite control program is started, a variable IA, which is a counter for determining an external storage where the differential copy data is stored, and a variable II, which is a counter for determining an external storage where the update log data is stored, are initialized to one (237), a total value of the number of external storages where differential copy data is stored and the number of external storages where update log data is stored is set to the counter JJ (239), and thereafter an update area control table 123 is defined in the virtual storage (27). Based on the unit of exclusion of the table, an exclusive control table 127 is defined in the virtual storage (137). Similarly, an update data storage area 11 formed of virtual pages equal in number to blocks of whole copy data is defined in the virtual storage (29).

In order to execute the input process for the differential copy data for the IA-th external storage, the expanded divisional input program is started (241). Next, it is judged whether or not expanded divisional input programs for all external storages where the differential copy data is stored have been started (243). If the program initiations are uncompleted, the counter IA is incremented by one (245), and the program execution proceeds to 241, or if the program initiations have completed, the expanded divisional input program is started in order to execute the input process for the update log data in the II-th external storage (246). It is judged whether or not the expanded divisional input programs for all external storages where the update log data is stored have been started (247). If the program initiations are uncompleted, the counter II is incremented by one (249), and the program execution proceeds to 246, or if the program initiations have completed, the sequence waits until the end of execution of each divisional input program (251). On completion of execution of each expanded divisional input program, it is judged whether the counter JJ-1 has become zero, indicative of the end of executions of all expanded divisional input programs that have been started at 241 and 246 (253). If the program executions are uncompleted, the counter JJ is decremented by one (255), and the program execution proceeds to 251, or if the executions have completed, the program execution proceeds to 149. The processes of 149 and after that are identical to the processes of the divisional overwrite control program of the embodiment 5 shown in FIG. 17, and explanation thereof will be omitted.

When the expanded divisional input program is started, the differential copy data record 186 or update log data record 19 (will be termed update data hereinafter) are fetched by the process similar to 217,219 and 165 shown in FIG. 24 for the expanded divisional input program in the embodiment 6 (257). It is judged whether or not the update data exists (259). If it is absent, the program is terminated, or if it is present, the flag in the update area control table corresponding to the update data storage area 11 where the update data is to be stored is turned on so as to lock the update area control table (169). Subsequently, it is judged whether or not a value is set at the update data acquisition time 132-A in the update area control table indicative of whether or not update data is already set in the update data storage area corresponding to the cylinder, track and block of the update data (261). If it is not set, the program execution proceeds to 169, or if it is set, judgement is made based on the update data which the program intends to input and the value of the update data type 235-A in the update area control table whether or not the input update data and the existing update data are consistent in type (263). If they are inconsistent, the program execution proceeds to 269, or if they are consistent, comparison is made between the value of the time sequential relation in the input update data record and the value of the update data acquisition time 132-A in the update area control table thereby to judge whether the update data is newer (265). If it is older, the program execution proceeds to 175, or if it is newer, input update data is set in the update data storage area (169) and thereafter it is judged whether or not the update data write-end flag 132-B in the update area control table is ON (172). If the flag is OFF, the program execution proceeds to 267, or if it is ON, the flag is turned off (173) and the input update data acquisition time 132-A and update data type 132-B are set in the corresponding update area control table (267). After that, the flag in the exclusive control table is turned off in order to unlock the update area control table (175), and the program execution proceeds to 257.

At 269, judgement is made on the type of the input update data (269). If it is found to be differential copy data, it is judged whether the input update data acquisition time is the same or older than the acquisition time 132-A of the existing update data (271). If it is true, the program execution proceeds to 175, or if it is false, the program execution proceeds to 169. In the case of update log data, it is judged whether or not the input update data acquisition time is the same or newer than the acquisition time 132-A of the existing update data (273). If it is true, the program execution proceeds to 169, or if it is false, the program execution proceeds to 175.

In case the update data which is intended to set in the update data storage area is differential copy data aquired in units of track, the processes from 169 to 175 are executed for each block of track for one differential copy data record.

By the foregoing method of restoring the database contents before the fault has occurred and multiplexing the database through the production of a copy of database by writing the differential copy data and database update log data over the whole copy data, the input processes of the differential copy data and update log data to the main storage or extended storage can be multiplexed for each storage unit where these data are stored, whereby the input time can further be reduced as compared with the sequential input process for each type of update data, and eventually the database copy time can be reduced.

According to this invention for the method of database fault recovery and database multiplexing through the database duplication production by writing, over copy data of the database, the database update log data after the time point of copy data acquisition, the time expended for overwriting the update log data can be reduced as follows.

(1) For the updating of the same block, the operation is confined only to the latest one in the block, and the unuseful overwriting process can be eliminated.

(2) In the conventional method, the update log data is written over the copy data in accordance with the time sequential order of their acquisition, and blocks in need of overwriting exist at random across the storage location (e.g., in the case of a magnetic disk which is most widely used as a copy data storage medium, there are physical locations in the storage determined on the basis of the cylinder position, track position and relative position in them). Accordingly, it takes a positioning time and rotation wait time for moving the actuator, which is a writing device, to the intended position for each piece of update log data. The mean value of the total time is around 24.3 ms, which is the sum of a 16 ms positioning time and a 8.3 ms rotation wait time on the currently available magnetic disk. Based on the fact that write positions are random, and that the access time is mostly attributable to the positioning time and rotation wait time, the average write time for each piece of update log data is conceivably as long as the above-mentioned mean value.

According to the inventive method, in which the update log data is written in units of track at once by being arranged in units of cylinder and track, allowing update log data on the same track to be written in one rotation period, whereby the rotation wait time for each piece of update log data can be minimized.

Moreover, the data is written sequentially in units of track in the order of tracks in the same cylinder and next tracks in the adjacent cylinder, which allows a minimal travel distance for the actuator, whereby the positioning time can also be reduced drastically. Namely, the inventive method virtually performs sequential writing.

Assuming a database of 300,000 pieces of update log data, with a data length of 8 K bytes and a data transfer rate of 3M bytes/sec from the magnetic disk unit:

(i) The time for reading update data out of the magnetic disk (in consideration of sequential reading) is calculated as follows.

$$300,000 \times 8K \text{ bytes}/3M \text{ bytes/sec} = 800 \text{ sec}$$

(ii) The time for writing the data over the copy data in the conventional method is:

$$300,000 \times 24.3 \text{ ms} = 7290 \text{ sec}$$

According to this invention, it is virtually equal to the read time for the update log data because of virtual sequential writing. More precisely, the time is expected much shorter in proportion to the number of duplicate blocks of the above item (1) and for the reduction of data for the data appended to the update log data, and based on the fact that the copy data is distributed on a plurality of magnetic disks.

Consequently, the time for writing the update log data over the copy data, which is the most part of the database duplication production time, is reduced significantly, whereby fast database duplication production can be accomplished.

(3) In case the update log data is stored in a plurality of external storage units, the input time can be reduced by implementing the data entry for each storage unit.

(4) In case the copy data is stored in a plurality of external storage units, the time for overwriting can be reduced by implementing the overwriting of the update log data for each storage unit.

In the foregoing processes, paging for areas in virtual storage can be avoided, whereby the degradation in the effectiveness of this invention caused by paging can be prevented.

Through the provision of real storage, which is assigned to the control flags and update data storage area in the virtual storage, in a nonvolatile storage unit, the event of recursive write process for the update log data over the copy data due to power outage or the like of the main storage does not occur, whereby a highly reliable database duplication producing process can be accomplished.

Through the use of the update log data produced at database updating, the need of reading the database update log data out of the external storage is eliminated.

Moreover, according to this invention for the method of producing a duplication of database, in which copy data only for updated portions of the database in one period, called differential copy, is written over the whole copy and thereafter the update log data of the database is overwritten. The differential copy existing on a plurality of planes is set in an updated data storage area which is defined in the virtual storage and next the update log data of the database is set, and subsequently the data is written in units of track and cylinder over the file where the whole copy is stored, and consequently the time of overwriting to the whole copy data by the process of writing the differential copy over the whole copy and the process of further overwriting the database update log data can be reduced by the amount resulting from the situation that the differential copy data and update log data in the same cylinder and track can be grouped into one. In case a plurality of differential copy data exist, the actuator scans across the storage only once for all of the plurality of differential copy data and update log data, whereas in the conventional method the actuator scans for each differential copy data, whereby the effectiveness of write time reduction is profound.

Moreover, instead of dealing with the update log data of the database, but by setting only a plurality of differential copy data as update data in the update data storage area defined in the virtual storage area and writing the data over the whole copy at once, it is also possible, for the retrieval of the contents of database at one time point or for the prior merging of the differential copy data in the whole copy, to carry out the writing process for the differential copy data up to that time point over the whole copy at a high speed.

Moreover, through the parallel implementation of the input process for the differential copy data to the main storage and the input process for the update log data to the main storage, the retardative execution time due to waiting for entry can be alleviated as compared with the case of sequential implementation of the processes. Particularly, if parallel input based on multiple processors is allowed, the total input time can be reduced from the total of the differential copy data input time and the database update log data input time to the longest of input times from storage units where the differential copy data and database update log data are stored, whereby the time for producing a duplication of database can further be reduced.

We claim:

1. A method of producing a duplication of a database having a writing step, in which copy data of said database in an external copy data storage are written over by update log data from an external log data storage, where the update log data was acquired after acquisition of said copy data, the method comprising the steps of:

(a) defining a virtual storage area which comprises virtual pages which have a one-to-one correspondence to blocks in said external copy data storage, and where the virtual pages are arranged in an order according to physical addresses of said blocks to which they correspond;

(b) defining a control table, which includes control values which have a one-to-one correspondence to said virtual pages, and where a control value of the control values will be set when the update log data is set to a corresponding virtual page;

(c) repeating the substeps of:

(i) reading out the update log data acquired in units of said blocks from said external log data storage;

(ii) checking said control value corresponding to the virtual page which corresponds to one of said blocks of copy data to be replaced by said update log data and when the control value has not been set, assigning a real storage for the virtual page and storing said update log data to said real storage assigned thereto, and setting the control value, when the control value has already been set, updating the real storage assigned for the virtual page with said update log data; and (d) searching said control table in the order of virtual page arrangement and repeating the substep of:

(i) when said control value is set, reading out the update log data in said real storage and writing over said copy data in said external copy data storage with said update log data, and resetting said control value.

2. A database duplication producing method according to claim 1, wherein the update log data is read out of the external log data storage, where said update log data has been stored in advance, in the order of acquisition of said update log data.

3. A database duplication producing method according to claim 1, wherein, for each external copy data storage where copy data is stored, update log data, which is set in the virtual storage of the virtual pages, is written over the copy data in the external copy data storage.

4. A database duplication producing method according to claim 1, wherein update log data, which overwrites on a same track of the external copy data storage where copy data is stored and is set in the real storage of a group of virtual pages, is written over the copy data in the external copy data storage prior to overwriting other copy data.

5. A database duplication producing method according to claim 1, wherein update log data, which overwrites on tracks of the same cylinder of the external copy data storage where copy data is stored and is set in the real storage of a group of virtual pages, is written over the copy data in the external copy data storage prior to overwriting other copy data.

6. A database duplication producing method according to claim 4, wherein the update log data is written over the copy data such that the travel distance of the actuator to the track of external storage where the copy data is stored is minimal.

7. A database duplication producing method according to claim 5, wherein the update log data is written over the copy data such that the travel distance of the actuator to the track of external storage where the copy data is stored is minimal.

8. A database duplication producing method according to claim 6, wherein update log data in units corresponding to tracks is written sequentially to tracks of an adjacent cylinder.

9. A database duplication producing method according to claim 7, wherein update log data in units corresponding to tracks is written sequentially to tracks of an adjacent cylinder.

10. A database duplication producing method according to claim 6, wherein update log data in units corresponding to tracks is written sequentially to tracks of a same cylinder and, next, tracks of an adjacent cylinder.

11. A database duplication producing method according to claim 7, wherein update log data in units corresponding to tracks is written sequentially to tracks of a same cylinder and, next, tracks of an adjacent cylinder.

12. A database duplication producing method according to claim 1, wherein the control value to be set indicates the time sequential relation on the acquisition of the update log data.

13. A database duplication producing method according to claim 12, wherein the update log data is entered and set to a virtual page for each external storage where update log data is stored.

14. A database duplication producing method according to claim 13, wherein update log data is fetched, and the value indicative of the time sequential relation of the acquisition of the update log data is compared with a control value in a control table corresponding to the virtual page to which the update log data is set, and the contents of the real storage of the virtual page is judged to be the latest update log data.

15. A database duplication producing method according to claim 13, wherein a control flag for the exclusive use of a control table is provided, update log data is fetched for each of external storages where update log data is stored, and the comparison process on the time sequential relation of the acquisition of the update log data is implemented.

16. A database duplication producing method according to claim 1, wherein the real storage has been assigned, and, in place of a page-out process for a virtual page where the update log data is set, the update log data is written over the copy data and the real storage is freed from the virtual page.

17. A database duplication producing method according to claim 1, wherein the real storage has been assigned, and, in place of a page-out process for a virtual page where update log data is set, the update log data is written over the copy data and the real storage is freed from the virtual page, and the control value field of the virtual page is initialized.

18. A database duplication producing method according to claim 16, wherein real storage has been assigned, and, in place of a page-out process for the virtual pages where update log data is set, update log data which is set in real storage of virtual pages, with corresponding tracks being on a same track as the virtual pages, is written over copy data prior to overwriting other copy data.

19. A database duplication producing method according to claim 17, wherein real storage has been assigned, and, in place of a page-out process for the virtual page where update log data is set, update log data which is set in real storage of virtual pages, with corresponding tracks being on a same track as of the virtual pages, is written over copy data prior to overwriting other copy data.

20. A database duplication producing method according to claim 1, wherein real storage of virtual pages where update log data and control values are set is assigned to nonvolatile storage.

21. A database duplication producing method according to claim 1, wherein, when updating of the database has been accomplished, update log data is set in an update data storage area.

22. A database duplication producing method according to claim 1, wherein only selected update log data for blocks of an external storage are selected for duplication by a duplication means, from among a group of update log data, and the selected data is set in real storage of a corresponding virtual page.

23. A database duplication producing method according to claim 1, wherein virtual storage areas are provided for each of the copy data for which duplication is intended and the update log data is stored to a corresponding virtual area of said virtual storage area.

24. A method of producing a duplication of a database stored in an external storage to protect against a fault of the database by writing, over whole copy data of the database, differential copy data which is a copy of only an updated portion of the database and update log data acquired after the acquisition of said copy data, the method comprising the steps of:
 (a) defining a virtual storage area, which comprises virtual pages which have a one-to-one correspondence to blocks in said external storage, and where the virtual pages are arranged in the virtual storage in an order according to physical addresses of the blocks in said external storage to which they correspond;
 (b) assigning real storage for said differential copy data, to a virtual page corresponding to a block where copy data to be replaced by said particular differential copy data exists, and storing the particular differential copy data in the real storage assigned thereto;
 (c) defining a control table, which includes control values which have a one-to-one correspondence to said virtual pages, and where a control value of the control values will be set when the update log data is set to a corresponding virtual page;
 (d) repeating the substeps of;
 (i) reading out the update log data acquired in units of said blocks from said external log data storage;
 (ii) checking said control value corresponding to the virtual page which corresponds to one of said blocks of copy data to be replaced by said update log data and when the control value has not been set, assigning real storage, for said update log data, to a virtual page corresponding to a block where copy data to be replaced by said update log data exists, and storing each update log data in the real storage assigned thereto and setting the control value, when the control value has already been set, updating the real storage assigned for the virtual page with said update log data; and (e) searching said control table in the order of virtual page arrangement and repeating the substep of:

(i) when said control value is set, reading the differential copy data and the update log data out of the real storages in the order of the virtual page arrangement and writing over the copy data in the external storage, and resetting said control value.

25. A database duplication producing method according to claim 24, wherein differential copy data is set in real storage of a virtual page and, next, update log data after the acquisition of the differential copy data is set in the real storage of the virtual page.

26. A database duplication producing method according to claim 25, wherein, when differential copy data exists over a plurality of generations, the differential copy data is fetched in the order of acquisition thereof.

27. A database duplication producing method according to claim 24, wherein, storing the differential copy data, with a value indicative of the time sequential relation appended to the first update log data after the acquisition of the differential copy data being appended thereto;

storing the latest time sequential relation appended to each differential copy data, when different differential copy data corresponding to a same virtual page exists;

storing the latest time sequential relation appended to each update log data, when different differential copy data corresponding to a same virtual page exists;

when update log data and different update log data corresponding to a same virtual page exists, the update log data is stored in the real storage if the time sequential relation appended to the update log data is the same or newer than the time sequential relation appended to the differential copy data; and when the differential copy data is stored in the real storage if the time sequential relation appended to the differential copy data is newer than the time sequential relation appended to the update log data.

28. A database duplication producing method according to claim 27, wherein, in correspondence to virtual pages, control tables for setting values indicative of the time sequential relation of data, which is set in real storage of the virtual pages, and the type of data are provided;

a value indicative of the time sequential relation and a value indicative of differential data are set in the control tables of a virtual page where the differential copy data is set; and a value indicative of the time sequential relation appended to update log data and a value indicative of update log data are set in the control tables of a virtual page where the update log data is set.

29. A database duplication producing method according to claim 27, wherein, in correspondence to virtual pages, a control table for setting the time sequential relation on differential copy data set in real storage of virtual pages and a control value field for setting the time sequential relation on update log data are provided.

30. A database duplication producing method according to claim 24, wherein a control flag for the exclusive use of the control table is provided, and process for setting the differential copy data and update log data to real storage of virtual pages is executed irrespective of the time sequential relation on the acquisition of said data.

31. A database duplication producing method according to claim 24, wherein only differential copy data for blocks of external storage, for which database duplication is intended, is selected from among a group of differential copy data, and the selected data is set in the real storage corresponding to a virtual page.

32. In a database system including an external copy data storage for storing copy data arranged into a plurality of blocks, and an external log data storage for storing update log data used to overwrite the copy data, a method for duplicating a database of the database system, the method comprising the steps of:

(a) defining a virtual storage including virtual pages which have a one-to-one correspondence with the copy data blocks;

(b) defining a control table, which comprises control values which are in a one-to-one correspondence to the virtual pages and where a control value of the control values when the update log data is set to a corresponding virtual page will be set;

(c) repeating the substeps of:

(i) reading out the update log data from the external log data storage in an arrangement corresponding to the blocks of copy data and setting the read out update log data to virtual pages in a reordered arrangement such that the update log data is reordered in the virtual storage to correspond to the arrangement of the copy data storage;

(ii) checking the control value corresponding to the virtual page which corresponds to one of the blocks of copy data to be replaced by the update log data and when the control value has not been set, assigning sequential real storage for the virtual pages set with the update log data and storing the virtual pages having the update log data to the real storage, and setting the control value;

when the control value has already been set, updating the real storage assigned for the virtual page with said update log data; and (d) searching said control table in the order of virtual page arrangement and repeating the substep of:

(i) when the control value is set, reading out the update log data from the virtual pages into the real storage and writing over the copy data in a sequence according to the reordered arrangement, and resetting the control value.

* * * * *

UNITED STATES PATENT AND TRADEMARK OFFICE
CERTIFICATE OF CORRECTION

PATENT NO. : 5,321,832
DATED : June 14, 1994
INVENTOR(S) : Kazuaki Tanaka, et al.

It is certified that error appears in the above-indentified patent and that said Letters Patent is hereby corrected as shown below:

Claim 30, column 32, line 12, before "process" insert --a--.

Signed and Sealed this

Twenty-third Day of August, 1994

Attest:

BRUCE LEHMAN

*Attesting Officer*  *Commissioner of Patents and Trademarks*